United States Patent
DeVries

(10) Patent No.: US 7,341,609 B2
(45) Date of Patent: Mar. 11, 2008

(54) REFORMING AND HYDROGEN PURIFICATION SYSTEM

(75) Inventor: Peter David DeVries, Spokane, WA (US)

(73) Assignee: Genesis Fueltech, Inc., Spokane, WA (US)

(*) Notice: Subject to any disclaimer, the term of this patent is extended or adjusted under 35 U.S.C. 154(b) by 498 days.

(21) Appl. No.: 10/263,949

(22) Filed: Oct. 3, 2002

(65) Prior Publication Data

US 2004/0065013 A1    Apr. 8, 2004

(51) Int. Cl.
    B01J 7/00    (2006.01)
    B01J 19/00    (2006.01)

(52) U.S. Cl. .................. 48/61; 48/127.9; 48/128; 48/198.1; 48/198.3; 48/198.7; 422/198; 422/211

(58) Field of Classification Search .............. 48/61, 48/127.9, 128, 198.1, 198.3, 198.7; 422/198, 422/211
    See application file for complete search history.

(56) References Cited

U.S. PATENT DOCUMENTS

| 4,430,304 | A | * | 2/1984 | Spurrier et al. ............. 422/204 |
| 4,849,187 | A | | 7/1989 | Uozu et al. |
| 4,904,455 | A | | 2/1990 | Karafian et al. |
| 5,198,002 | A | | 3/1993 | Mei et al. |
| 5,215,729 | A | | 6/1993 | Buxbaum |
| 5,226,928 | A | | 7/1993 | Makabe et al. |
| 5,401,589 | A | | 3/1995 | Palmer et al. |
| 5,484,577 | A | | 1/1996 | Buswell et al. |
| 5,525,322 | A | | 6/1996 | Willms |
| 5,580,523 | A | | 12/1996 | Bard |
| 5,589,599 | A | | 12/1996 | McMullen et al. |
| 5,637,259 | A | | 6/1997 | Galuszka et al. |

(Continued)

FOREIGN PATENT DOCUMENTS

EP    0615949    9/1994

(Continued)

Primary Examiner—Glenn A. Caldarola
Assistant Examiner—Kaity Handal
(74) Attorney, Agent, or Firm—Andrus, Sceales, Starke & Sawall, LLP

(57) ABSTRACT

A reforming and hydrogen purification system operating with minimal pressure drop for producing free hydrogen from different hydrogen rich fuels includes a hydrogen reforming catalyst bed in a vessel in communication with a core unit containing a hydrogen permeable selective membrane. The vessel is located within an insulated enclosure which forms an air inlet passageway and an exhaust passageway on opposite sides of the vessel. Air and raffinate pass through a burner within the air inlet passageway, providing a heated flue gas to heat the catalyst to the reaction temperature needed to generate free hydrogen from the feedstock. The burner flue gas flows laterally over and along the length of the bed between the input and output ends of the bed. Hydrogen is recovered from the core for use by a hydrogen-consuming device such as a fuel cell. The remaining unrecovered hydrogen in the reformed gases is contained in raffinate and is used to supply process heat via the burner. The exhaust flue gas and the inlet air supply pass through a recuperator in which the inlet air is heated from the hot exhaust gas. The feedstock input line is also coupled to the raffinate line and the hydrogen recovery line to preheat the feedstock prior to entry into the catalyst bed.

40 Claims, 14 Drawing Sheets

U.S. PATENT DOCUMENTS

| | | | |
|---|---|---|---|
| 5,639,431 A | 6/1997 | Shirasaki et al. | |
| 5,674,301 A | 10/1997 | Sakai et al. | |
| 5,679,249 A | 10/1997 | Fendya et al. | |
| 5,738,708 A | 4/1998 | Peachey et al. | |
| 5,741,474 A | 4/1998 | Isomura et al. | |
| 5,741,605 A | 4/1998 | Gillett et al. | |
| 5,795,666 A | 8/1998 | Johnssen | |
| 5,811,065 A | 9/1998 | Sterenberg | |
| 5,861,137 A | 1/1999 | Edlund | 423/652 |
| 5,874,051 A | 2/1999 | Heil et al. | |
| 5,888,273 A | 3/1999 | Buxbaum | |
| 5,897,970 A | 4/1999 | Isomura et al. | |
| 5,925,476 A | 7/1999 | Kawatsu | |
| 5,931,987 A | 8/1999 | Buxbaum | |
| 5,932,181 A | 8/1999 | Kim et al. | |
| 5,938,800 A | 8/1999 | Verrill et al. | 48/127.9 |
| 5,955,044 A | 9/1999 | Lucht et al. | |
| 5,980,989 A | 11/1999 | Takahashi et al. | |
| 5,997,594 A | 12/1999 | Edlund et al. | |
| 6,051,192 A | 4/2000 | Maston et al. | |
| 6,098,620 A | 8/2000 | Lloyd et al. | |
| 6,129,861 A | 10/2000 | Meusinger et al. | |
| 6,152,987 A | 11/2000 | Ma et al. | |
| 6,152,995 A | 11/2000 | Edlund | |
| 6,165,438 A | 12/2000 | Willms et al. | |
| 6,168,650 B1 | 1/2001 | Buxbaum | |
| 6,207,132 B1 | 3/2001 | Lin et al. | 423/648.1 |
| 6,214,090 B1 | 4/2001 | Dye et al. | |
| 6,214,484 B1 | 4/2001 | Hauer | |
| 6,221,117 B1 | 4/2001 | Edlund et al. | |
| 6,231,831 B1 | 5/2001 | Autenrieth et al. | |
| 6,242,120 B1 | 6/2001 | Herron | |
| 6,267,792 B1 | 7/2001 | Nagamiya et al. | |
| 6,267,801 B1 | 7/2001 | Baake et al. | |
| 6,294,149 B1 | 9/2001 | Autenrieth et al. | 423/648.1 |
| 6,303,245 B1 | 10/2001 | Nelson | |
| 6,319,306 B1 | 11/2001 | Edlund et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 2001/0000380 A1 | 4/2001 | Buxbaum | |
| 2001/0018139 A1 | 8/2001 | Aoyama et al. | |
| 2001/0045061 A1 | 11/2001 | Edlund et al. | |
| 2001/0049038 A1 | 12/2001 | Dickman et al. | |
| 2001/0053472 A1 | 12/2001 | Edlund | |
| 2002/0041837 A1 | 4/2002 | Edlund et al. | |

FOREIGN PATENT DOCUMENTS

| | | |
|---|---|---|
| EP | 1 024 111 | 8/2000 |
| EP | 1 055 638 | 11/2000 |
| JP | 03309265 | 6/1993 |
| JP | 5147902 | 6/1993 |
| JP | 07153320 | 6/1995 |
| JP | 09283305 | 10/1997 |
| JP | 20128505 | 5/2000 |
| JP | 20143203 | 5/2000 |
| WO | 98/52868 | 11/1998 |
| WO | WO 9936351 A1 * | 7/1999 |
| WO | WO99/65097 | 12/1999 |
| WO | 01/68514 | 9/2001 |
| WO | WO02/070402 | 9/2002 |

* cited by examiner

REFORMING AND HYDROGEN PURIFICATION SYSTEM

BACKGROUND OF THE INVENTION

The present invention is directed to a steam reformer for producing purified hydrogen including purified hydrogen for fuel cells.

Purified hydrogen is an important commodity in semiconductor, metallurgical, and chemical processing. It is also highly useful as a source of fuel for fuel cells, which can produce electrical power from hydrogen. There are a variety of means for producing purified hydrogen. Hydrogen can be liberated from hydrogen-containing compounds such as alcohol by reforming with steam at elevated temperatures over a catalyst bed. Since this reaction is endothermic, the heat can be supplied from an external burner, or the heat can be supplied in-situ by mixing some oxygen and partially burning some of the fuel. The former process is generally called steam reforming; when air or oxygen is mixed with the fuel to supply heat the process is referred to as autothermal or partial oxidation reforming. Once the reforming process has been completed, substantial percentages of carbon monoxide will exist in the reformed gas; this carbon monoxide may be further reacted in a water-gas shift catalyst bed to form hydrogen and carbon dioxide. This lowers the percentage of carbon monoxide in the reformed gas.

To create high purity hydrogen from the reformed gas mixture, means can be employed to separate the hydrogen, e.g. via a selective membrane. The high purity hydrogen can then be used in an industrial process, in a fuel cell for power generation or other applications requiring purified hydrogen. In some cases, hydrogen purification is not used; the reformed gas is sent to a fuel cell after a selective oxidation step to further reduce carbon monoxide levels. In the latter case, the reformer will generally require dewpoint control, careful attention to prevent high carbon monoxide levels, and integration means with the fuel cell to receive the spent gas after much of the hydrogen has been exhausted.

The technology for hydrogen purification is well known, such as disclosed in U.S. Pat. No. 5,861,137 entitled Steam Reformer With Internal Hydrogen Purification issued Jan. 19, 1999. The above patent discloses a hydrogen purification system and discusses the prior art and the state of the prior art. The need for a practical reformer, requiring a cost effective design is clear. The patent discloses a method and system for partially extracting of a portion of purified hydrogen from an appropriate fuel feedstock of hydrogen containing fuel and using the discharged raffinate, with a significant amount of hydrogen therein, as the fuel for operating the burner.

In addition to a significant number of patents, a substantial volume of other publications are available describing various systems and aspects of hydrogen purification including systems based on steam reforming. Nevertheless, there is continuing demand for an improved hydrogen purification system which is cost effective both initially and during its operating life, as well as readily adapted for efficient and cost effective servicing. There is a particular demand for a reformer with a low pressure drop in the burner air system.

SUMMARY OF THE INVENTION

The present invention is particularly directed to a hydrogen purification reformer which may be constructed as a compact unit with efficient heating of the reformer from a burner. The burner gas has a minimal pressure drop in the system which results in a low power and low cost air supply for processing of the hydrogen rich fuel.

The novel reformer system of the present invention includes a catalyst unit or bed which is constructed and arranged along the path of a feedstock between a feedstock input and a spaced feedstock output. The catalyst is operable upon heating to establish an endothermic reaction on the feedstock to produce hydrogen. The catalyst may be of any operative material, in any available form, such as a self supporting mass, a granular mass or combination thereof. If a granular mass is used, a confining enclosure supports the mass with a construction allowing release of the hydrogen therefrom for subsequent collection via a hydrogen permeable membrane.

In accordance with a particular feature of this invention, a burner unit has a flue gas output stream communicating essentially directly from the burner unit to the catalyst unit and having a length substantially on the order of the length of the catalyst unit, i.e. typically the spacing between the catalyst unit's outlet and inlet. The flue gas stream thus passes laterally over substantially the entire length of the catalyst resulting in minimal air pressure drop in the system.

A hydrogen collector is located adjacent the catalyst unit to collect the purified hydrogen, or may alternatively be located downstream in the same or in a separate pressure vessel. In accordance with current practice, the hydrogen collector may include one or more hydrogen selective permeable membrane units located along the path of the hydrogen liberated from the catalyst bed to collect the hydrogen.

The preferred construction particularly provides for the efficient functioning of the catalyst and the heating of the catalyst, the feedstock and the air supply, as well as permitting use of a relatively low pressure air supply, yielding higher energy efficiency.

This construction thus establishes improved heating of the catalyst to produce the free hydrogen and the extraction thereof from a catalyst unit. This system further permits optimizing the heating pattern of the stream over the length of the bed for the internal processing of the feedstock, as hereinafter described.

In a preferred construction, a pressure vessel contains a closed hydrogen selective permeable membrane core unit surrounded by a catalyst bed or unit. A gas fired heating unit has a flue gas output which is aligned with the pressure vessel and particularly the catalyst unit. The heating unit creates a flue gas stream related to the length and cross section of the catalyst unit. The flue gas stream passes laterally over the catalyst unit to heat the catalyst unit throughout the length thereof. The catalyst unit may be heated uniformly or may be heated to a desired thermal gradient.

The hydrogen rich feedstock passing through the heated catalyst unit is reformed, producing hydrogen. A substantial portion of this hydrogen subsequently passes through the hydrogen selective permeable membrane core unit, and the remaining hydrogen and other gases, hereinafter referred to as raffinate, exits the pressure vessel, passes through a pressure control device such as a back pressure regulator, and is subsequently is used to supply heat for the reforming process via the gas fired heating unit.

The heating unit is preferably a catalytic burner which is preferably fueled by the raffinate exiting the pressure vessel. The burner may be a separate burner or constructed as an integrated part of the pressure vessel. In either construction, the raffinate is mixed with air, travels through the burner, and passes a heated stream of flue gas directly from the burner over the pressure vessel.

In either construction, the pressure vessel includes an outer shell or wall which is formed of a heat conductive material. A plurality of heat conductive fins are intimately affixed to the outer wall throughout the vessel, through which the heated burner flue gas passes to thoroughly heat the reforming catalyst bed contained within the pressure vessel. The pressure vessel is located between and defines an inlet burner flue gas passageway and an outlet burner flue gas passageway.

In a preferred construction, the feedstock is preheated through recovery of heat from at least one of the purified hydrogen, the raffinate, and the burner flue gas, and preferably from all three sources. Even if the feedstock is fully preheated to the desired reaction temperature, the endothermic reaction within the catalyst generally requires an additional supply of heat such as from the burner flue gas in order to maintain a sufficient temperature for the desired reforming reactions to occur.

The pressure vessel is also preferably formed with a hydrogen collection system including one or more collection structures. Each collection structure includes an inner membrane core of a porous material with a metallic hydrogen permeable selective membrane affixed to the core that forms a hydrogen selective core-membrane unit. The metallic hydrogen selective membrane may, for example, be a palladium or a palladium-copper alloy coating, the latter which may be fabricated with plating and annealing techniques familiar to those skilled in the art. In addition, each core-membrane unit is separated and spaced from the catalyst unit, particularly where a granular catalyst is used, to prevent abrading contact of the thin membrane with the catalyst material. For this purpose and particularly where a granular catalyst is used, a guard layer may be placed between the catalyst and the membrane, where the guard is porous or contains apertures for communicating the reformed gases to the hydrogen selective permeable membrane.

The pressure vessel is further formed in the preferred embodiment with an outer closed end and an opposite open end, which may be closed by a releasable cover or header unit. The input and output lines are secured to the cover. The lines include a feedstock line to input the feedstock into the catalyst bed, a raffinate output line to receive the raffinate from the catalyst unit and a purified hydrogen output line for transmitting the purified hydrogen from the core-membrane unit.

The pressure vessel is typically formed of a metallic alloy. A plurality of spaced fins, which are also good conductors of heat, are firmly affixed to and extend from the pressure vessel. However, in smaller embodiments where the surface-area-to-volume ratio is favorable, the fins may not be necessary for heat transfer into the catalyst area, and the pressure vessel fins may then be eliminated from the preferred embodiment, with the vessel still defining the air and heating gas passageway and the exit or exhaust passageway.

The heating system preferably includes a controlled distribution of a stream of the burner fluid or flue gas over the catalyst unit to produce an optimal reforming of feedstock. This requires a maximum heat input at the inlet or entrance of the feedstock into the unit with a progressive patterned reduction or gradient over the length of the unit to the outlet, since a higher proportion of the endothermic reaction occurs nearest the entrance point (the inlet end) into the catalyst.

In accordance with a further aspect of the invention, the burner flue gases, the heated raffinate and the collected hydrogen, all of which contain significant levels of heat are used to heat the cold input air to the burner and to preheat the hydrogen rich feedstock prior to passing of the feedstock through the reforming catalyst unit.

In a preferred construction, separate conduits carry the raffinate and the purified hydrogen as they exit the pressure vessel. The conduits each include at least in part a metal or other heat transfer material which are coupled and preferably bonded to each other and to a corresponding third metal conduit carrying the feedstock to the catalytic unit, in counterflow fashion. The several conduits are preferably coupled to each other by a high heat transfer bonding, as by welding, brazing or the like, to promote heating of the cold feedstock. Other forms of coupling the conduits may be used.

In addition, in one preferred construction, the flue gas from a catalytic burner unit downstream of the catalyst bed is coupled to an extended length of the input feedstock line, as by locating a coiled length thereof within the outlet passageway carrying the hot exhaust flue gas. This construction can be used to preheat the feedstock with the flue gas exhaust, which is particularly advantageous when using a catalytic burner.

In accordance with a further preferred construction, a burner air inlet chamber for supplying air to the burner and an exhaust chamber for discharging of the flue gas from the catalytic unit are located in closely-spaced side-by-side orientation. A heat recuperator includes a transfer assembly extended between the two chambers to thereby capture the heat in the burner flue gas and transmit the heat to the burner inlet air, preferably in a counterflow fashion, prior to exhausting of the flue gas from the system. This construction can be used to preheat the burner inlet air with the flue gas exhaust.

A preferred structure of the heat transfer assembly includes a series of relatively thin heat conductive and apertured plates which extend between and across the two chambers. The plates are separated by thin thermally insulating separators between the adjacent chambers to prevent the burner flue gas from passing into the air inlet chamber or passageway. These thin separators may also serve to thermally isolate the apertured plates from one another.

The reformer apparatus is further preferably constructed by orienting of the components in a linear, parallel orientation along a linear axis. The maximum output is thereby related to the proportional linear length of the related components, with the catalytic burner area, catalyst volume, and heat transfer surface areas generally remaining constant per unit length of the device.

Thus, the location and structure of the burner, and several heat recuperating systems have a linear orientation related to the pressure vessel. The capacity of the reforming system is then directly related to the linear length of the components in the final assembly resulting in efficient and ready scaling of hydrogen generation.

Various monitors may be and preferably are coupled to the fluids within the system to control the operation of the reformer.

Various other objects, features and advantages of the invention will be made apparent from the following description taken together with the drawings.

BRIEF DESCRIPTION OF THE DRAWINGS

The drawings disclose a preferred embodiment of the invention connected to a hydrogen fuel cell.

In the drawings:

FIG. 3 is a rear perspective view of FIG. 2a;

DESCRIPTION OF ILLUSTRATED EMBODIMENT

Figure 1:
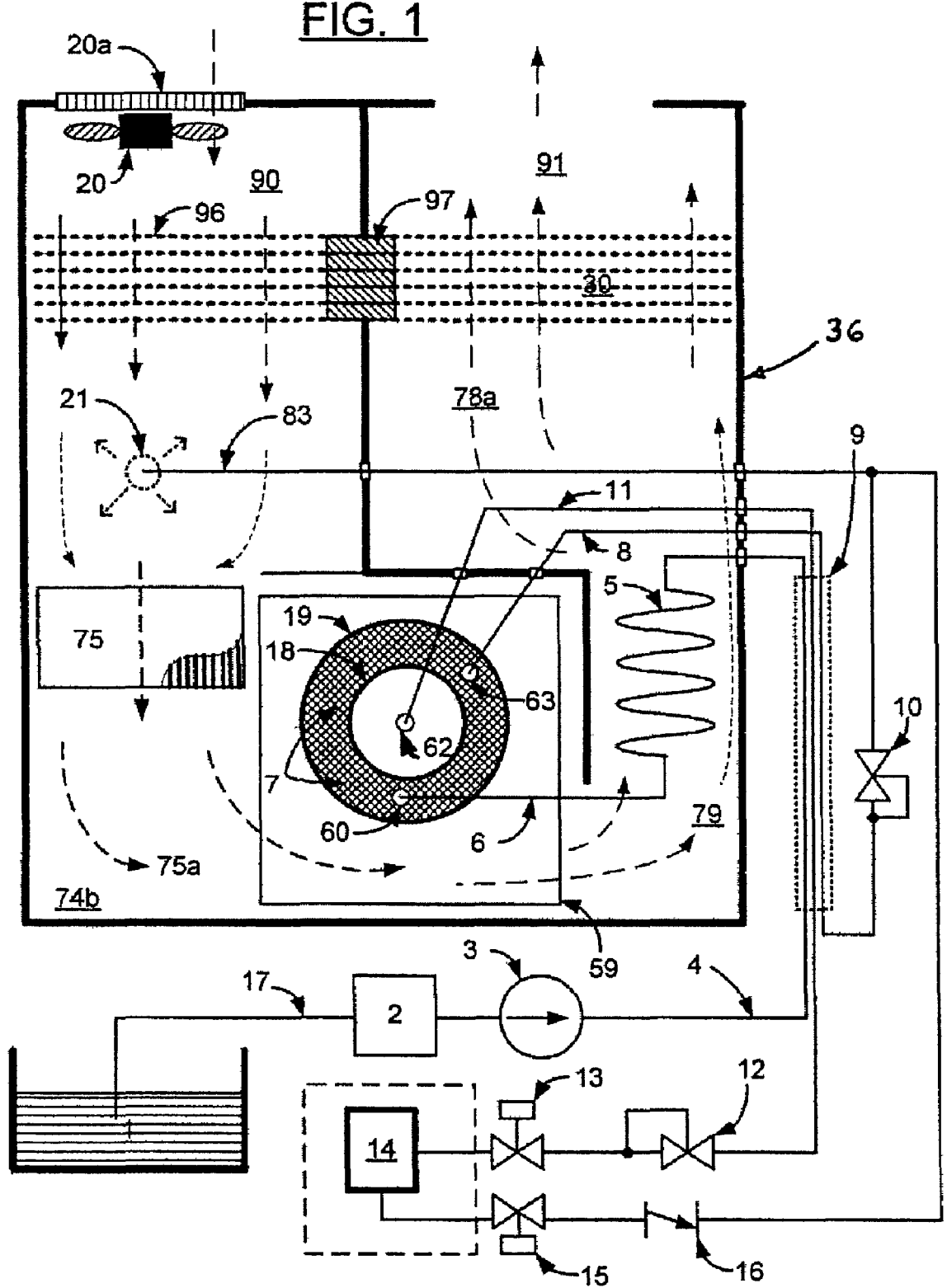
FIG. 1 is a schematic illustration of a steam reformer unit for producing purified hydrogen coupled to a fuel cell.

FIG. 1 is a simplified illustration of a system for generating purified hydrogen from a hydrogen rich fuel source 1 for consumption by device 14, which may, for example, be a fuel cell used for supplying electrical power to a load. The illustrated embodiment of FIG. 1 includes a unique hydrogen purifier 18 within a suitable support such as outer housing 36, in combination with the associated components.

The system of FIG. 1 includes a steam reformer having a reformer pressure vessel unit 19 which is operable to process fuel/water feedstock from a source 1. Although a common pump for the fuel and water is illustrated for the case where the fuel and water are miscible as a pre-mixed feedstock, it is understood that more than one pump may be used for the fuel and water, respectively, along with any needed flow and pressure monitoring means, with the fuel and water streams meeting together prior to arriving at the catalyst filled chamber 7. The pressure vessel unit 19 contains an inner hydrogen purifier core unit 18. The pressure vessel unit 19 is larger than the unit 18 and forms the catalyst-filled chamber 7.

The fuel from source 1 is shown as a mixture of fuel and water and constitutes a feedstock which is pulled through line 17 to filter 2, and pumped by a pump 3 via a line 4 to the counterflow heat exchanger 9. After receiving heat at heat exchanger 9 the feedstock then receives more heat in heat exchanger 5, finally arriving at pressure vessel 19 by means of line 6 into pressure vessel inlet connection 60. The feedstock thus is fed into catalyst filled chamber 7, which is heated, as hereinafter described, and the fuel/water feedstock reacts to produce free hydrogen. Unit 18 is an elongate member which contains a special hydrogen selective permeable membrane, as hereinafter described, which passes the hydrogen contained in the reformed gases into the interior of unit 18, wherein the purified hydrogen is subsequently transferred to line 11 by means of hydrogen outlet 62. While generally illustrated as a tubular member the shape of unit 18 is not constricted to any particular form, and can assume any form suitable for the application. Hydrogen purified by unit 18 and passing through line 11 transmits heat to the feedstock in heat exchanger 9 prior to passing through hydrogen output pressure regulator 12. Once the hydrogen pressure has been regulated by regulator 12 the hydrogen may then pass through solenoid valve 13 to consuming device 14. Since consuming device 14 may consist of a fuel cell with a required periodic bleed, a return line from consuming device 14 is included, with passage through bleed solenoid valve 15 and check valve 16, where the bleed hydrogen is injected into line 83.

The volume and activity of catalyst 7 and the heating thereof is such that the processed fuel is nearly completely steam-reformed by the time it is withdrawn through line 8.

The remaining fuel and reaction by-products, including unliberated hydrogen, hereinafter referred to as raffinate, is withdrawn from catalyst-filled chamber 7 by a line 8. The raffinate then transmits heat to the incoming feedstock in heat exchanger 9, after which it passes through feedstock back pressure regulator 10. The raffinate depressurizes upon passing through regulator 10 and travels though line 83 to burner distributor 21.

A catalytic burner 75 is mounted within outer housing 36 to receive raffinate from distributor 21 mixed with burner air. The raffinate is discharged into the air flow via pores or holes in distributor 21, such as more clearly shown in FIG. 13 for a dual-distributor mechanism. The air and raffinate are mixed at the input to burner 75 which creates a hot flue gas stream 75a which passes into the adjacent chamber and functions as described above to heat the catalyst filled chamber 7.

The system shown in FIG. 1, provides particular features for improving the efficiency and functioning of the reforming process for the generation and purification of hydrogen. In particular, the system provides various heat recovery from the heated fluids in the lines at heat exchanger 9 and the heated flue gases 78a which flow downstream of heat exchanger 5.

As shown in FIG. 1, the portions of lines 4, 8 and 11 are coupled to each other by a counterflow heat exchange unit 9 which transfers heat from the reformed gases back to the incoming feedstock in counterflow fashion. This improves efficiency and also serves to cool the gas prior to arrival at hydrogen output regulator 12 and feedstock pressure regulator 10, protecting the devices from thermal damage. In addition, as also shown in FIG. 1, the line 4 is shown with a coiled heat exchanger section 5 which is in contact with the burner flue gas 79. Heat exchanger 5 is configured to raise the feedstock to the desired operating temperature for the catalyst in catalyst-filled chamber 7. Depending on the capacity of the reformer, heat exchanger 5 may include several turns of finned tubing to facilitate heat transfer from flue gas 79, or it may consist of an unfinned tube with one or more parallel turns.

Additionally, a heat transfer assembly 30 is located spanning the exhaust chamber 91 and the burner air inlet chamber 90 downstream of fan 20 and fan filter 20a. A backup fan 20b, as illustrated in FIG. 2a, may also be used in series with the main fan 20. The hot flue gas 78a entering assembly 30 raises the temperature of the assembly 30 on the flue gas side which transmits the heat into the cool portion of the assembly 30 on the air inlet in a counterflow fashion. More specifically, the assembly 30 is specially constructed to prevent the transfer of fluids in the respective chambers into the other chamber, as more fully described in a preferred construction of the system of FIG. 1, as shown in FIGS. 2-12, by the use of thermally insulating sealing gasket 97. Insulating gaskets 97 furthermore allow the perforated or expanded metal plates 96 of assembly 30 to operate at different temperatures such that counterflow exchange may be improved.

While the arrangement of heat exchangers regulators, valves, and the like illustrated in FIG. 1 are specifically shown in a preferred orientation, various arrangements of parts may be employed to achieve similar results within the framework of the invention, and may be arranged as needed by those skilled in the art.

Figure 2:
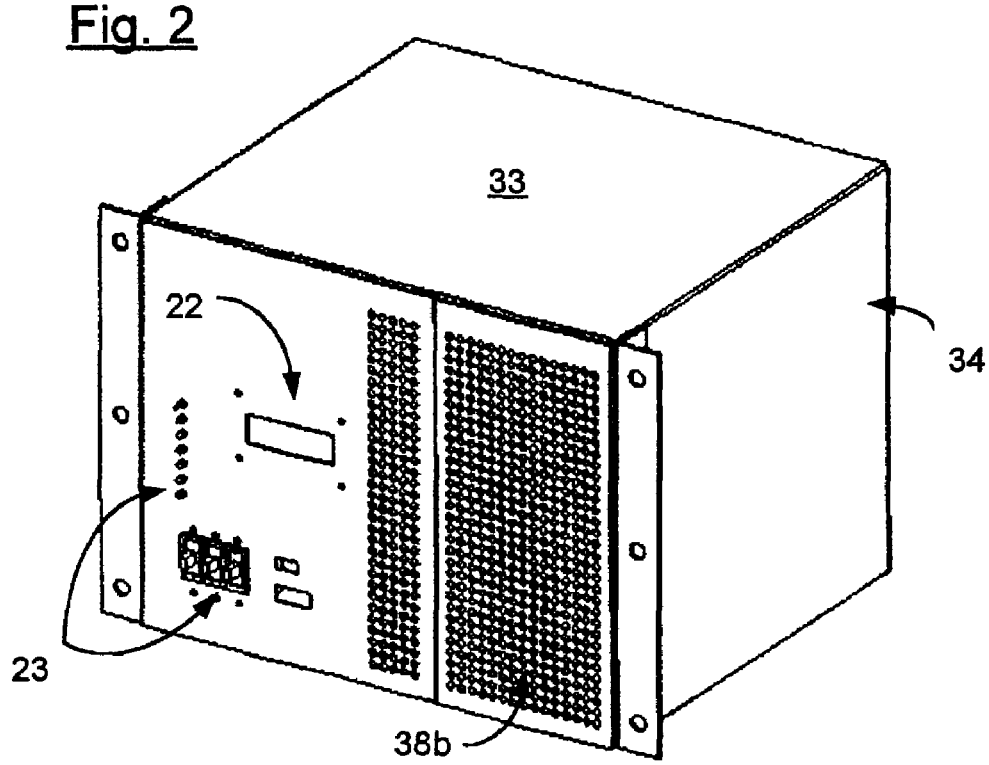
FIG. 2 is a pictorial view of a hydrogen purifying unit.
Figure 2A:
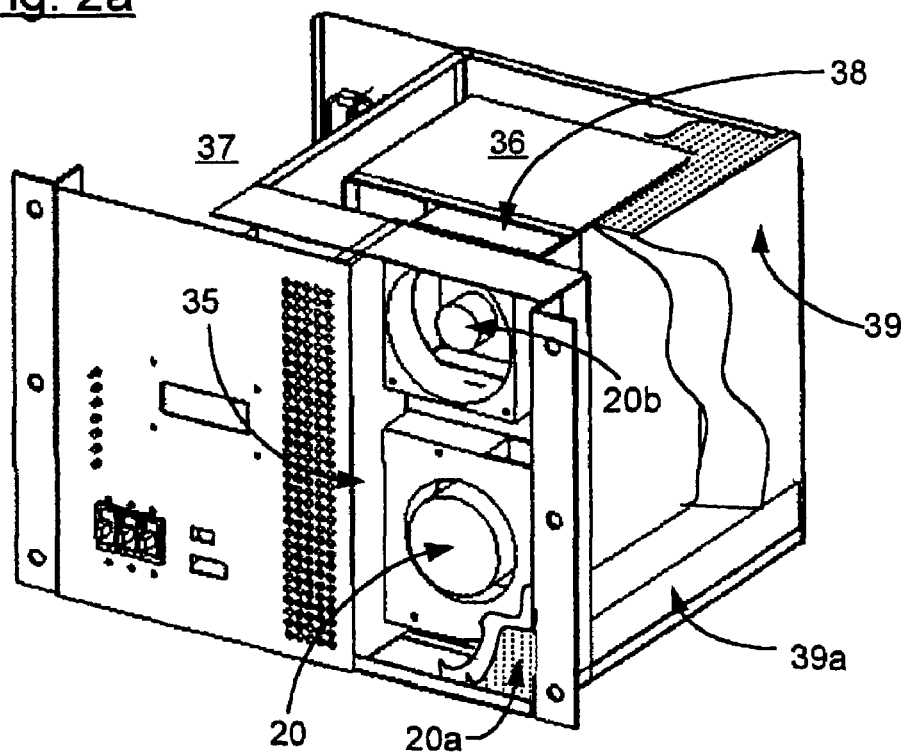
FIG. 2a is a view of the hydrogen purifying unit of FIG. 2 with a partial removal of the outer walls.
Figure 3:
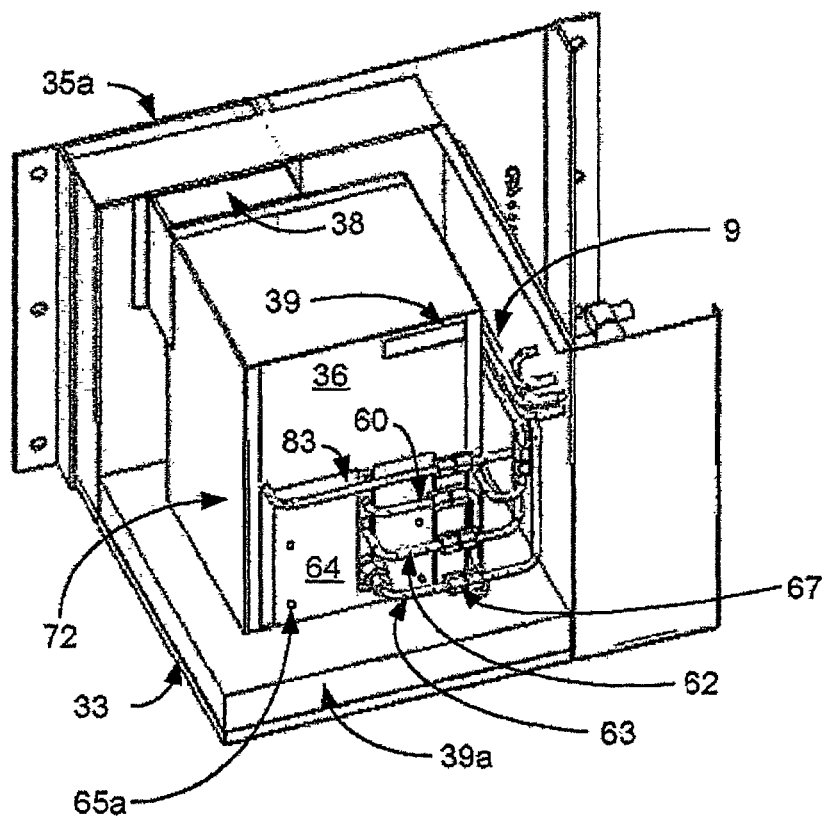
Figure 4:
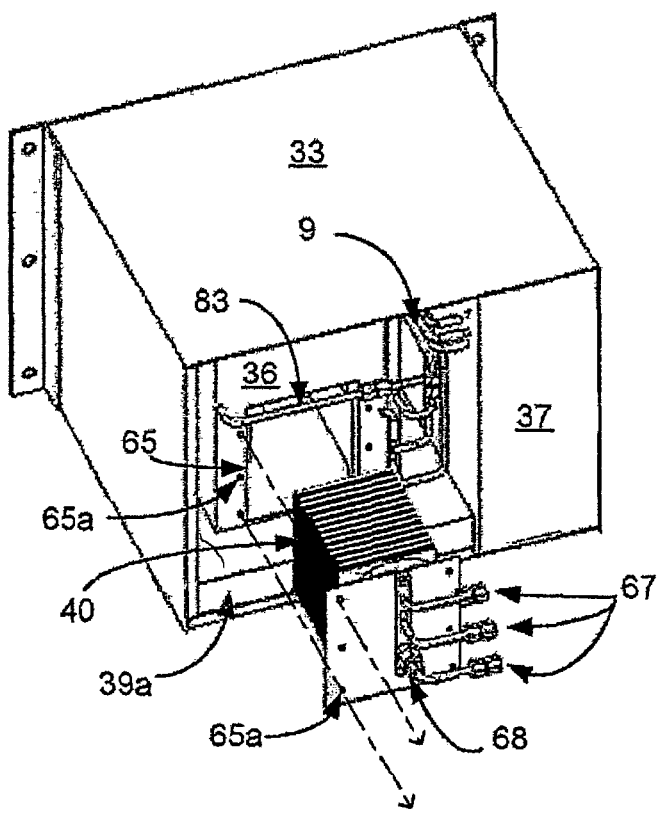
FIG. 4 is a rear perspective view of a hydrogen reformer unit shown in FIG. 2 with a reformer vessel unit removed.
Figure 5:
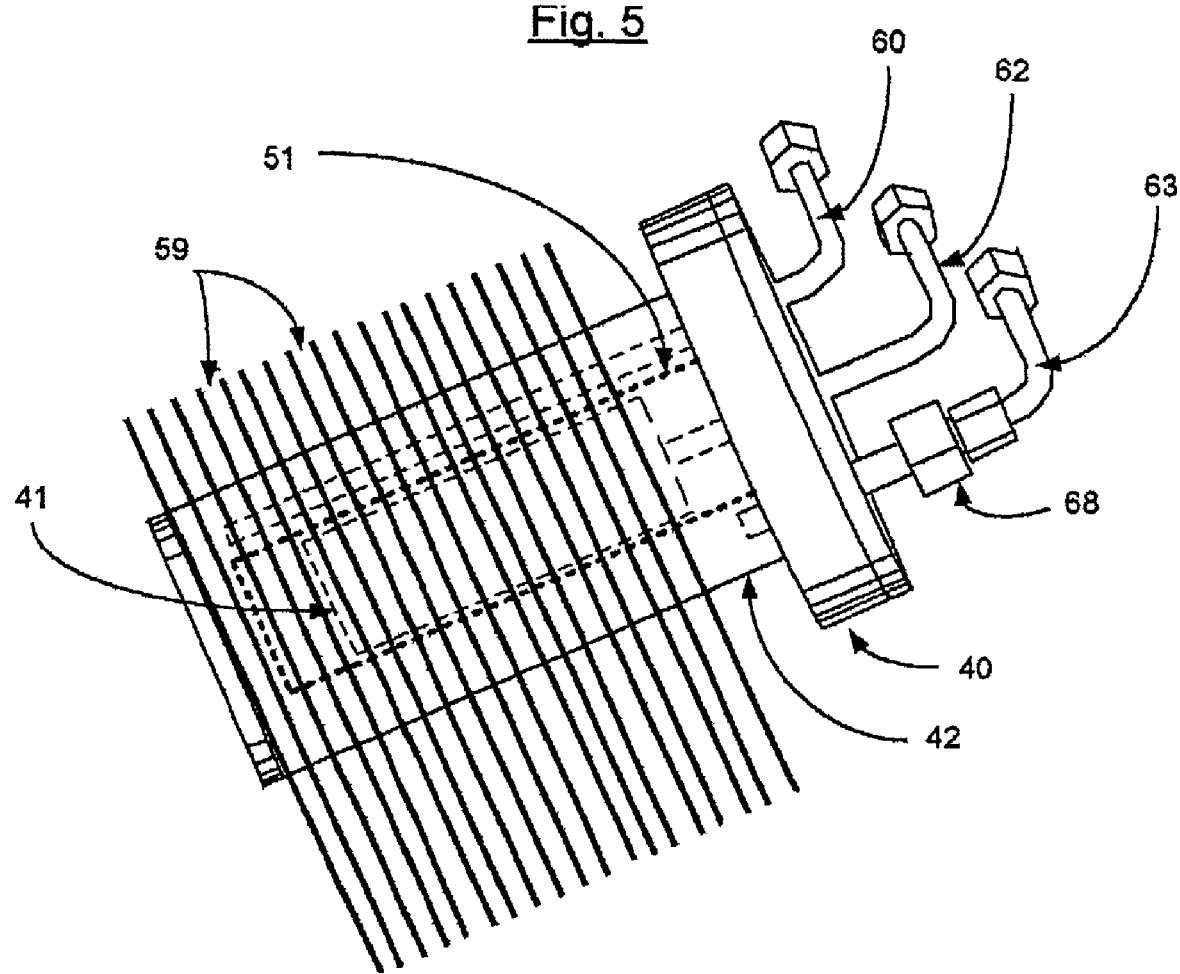
FIG. 5 is a perspective view the vessel unit shown in FIG. 4 for reforming of purified hydrogen.
Figure 6:
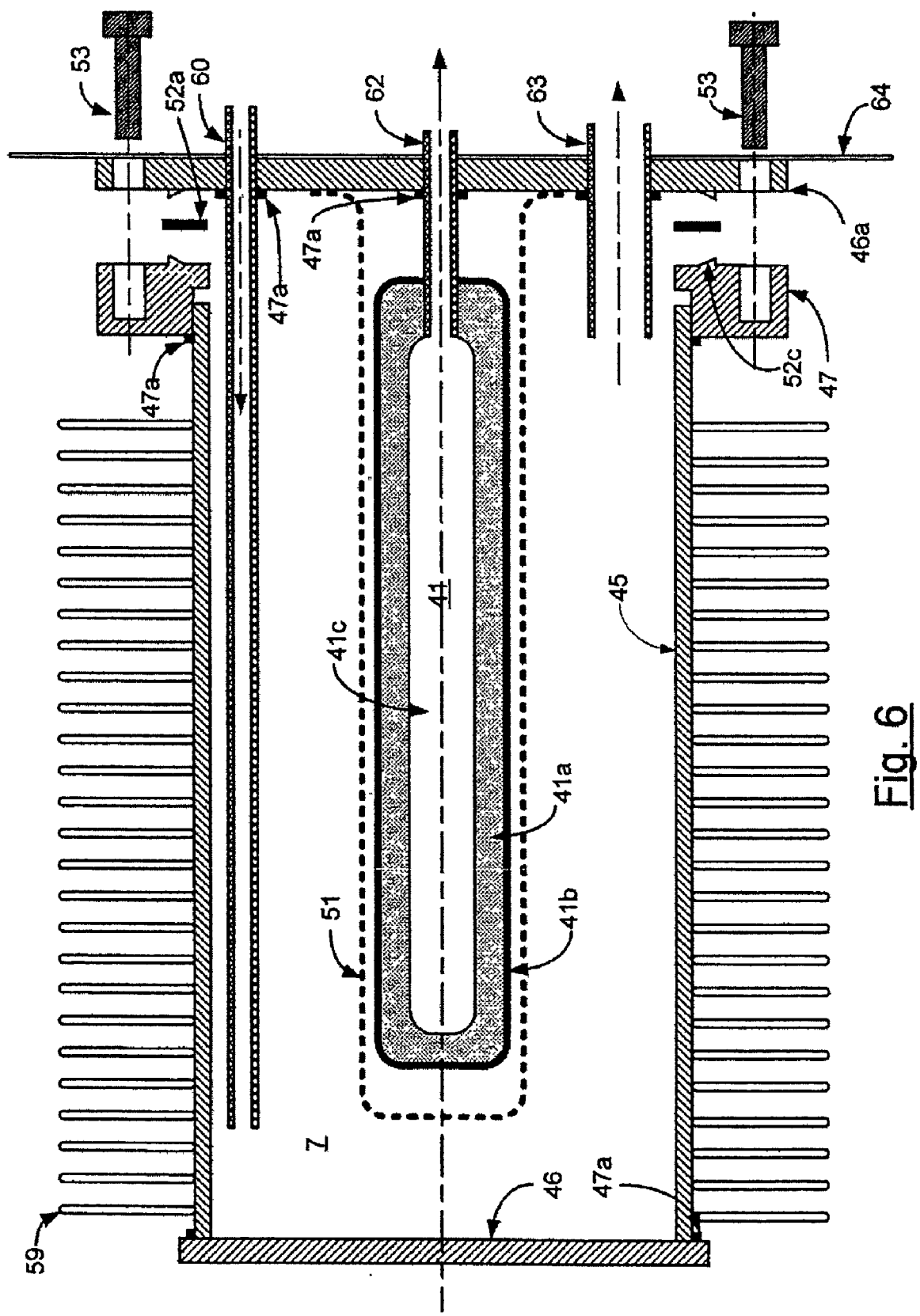
FIG. 6 is an exploded cross sectional view of the vessel unit shown in FIG. 5.

Referring to FIGS. 2-4, a compact hydrogen source unit 33 includes an outer enclosure wall 34 (partially shown in FIGS. 2a-4) within which an air supply section 35 is formed across the front wall, and connected to a hydrogen generating unit enclosed in enclosure 36. A control section 37 is located to the one side of the air supply section 35 and the hydrogen generator unit in enclosure 36. Section 37 contains various parts previously described in FIG. 1 such as the pressure regulation and solenoid valves.

The air supply section 35 includes a housing with an air filter 20a within which an air supply fan 20 is located with a backup fan 20b downstream of fan 20. As illustrated in FIG. 2a the backup fan 20b is an axial type, and the main fan 20 is of a blower type. Fan 20 pulls air through filter 20a and blows it into a housing surrounding backup fan 20b. An air passageway tube 38 connects the output end of backup fan 20b to the hydrogen generator unit in enclosure 36. The outer face of the housing 35a is covered by filter 20a and an outer apertured face cover 38b.

The hydrogen generator unit in enclosure 36 is mounted behind the air supply section 35 and is surrounded by perimeter insulation 39 resting on a rigid thermally insulating base support platform 39a. The insulation surrounding the high temperature parts contained in enclosure 36 permits the efficient operation of the reformer. Specifically this is done by placing the metallic fastening means to enclosure 36 at the lowest temperature portion of enclosure 36. This includes the air passageway tube 38, and the top of unit 33 in FIG. 2, to which enclosure 36 is fastened. This permits structural attachment of enclosure 36 to the rest of device 33 while minimizing thermal losses. The input of the air to the generating unit in enclosure 36 is via the air passageway tube 38. It should be noted that the perimeter wall insulation 39 is only partially shown for clarity of illustrations and understanding of the processing of the air and heating fuel system of the preferred system.

Referring to FIGS. 4-8, the pressure vessel unit 19 of FIG. 1 is shown in a preferred finned construction and identified hereinafter as pressure vessel 40. The pressure vessel 40 includes an outer shell or container 42 within which an inner purifier core unit 41 which is centrally located and secured. In the preferred embodiment, a separate cup-shape guard member 51 is secured between the outer shell or container 42 and the purifier core unit 41. The guard member 51 is spaced from the container 42 and forms a catalyst chamber 7 and is also spaced from the core unit 41 to prevent abutting engagement of a granular catalyst 50 in chamber 7 with the core unit 41.

In particular, the container 42 includes an outer tubular wall 45, open at both ends prior to assembly. The outer end wall 45 is closed by a flat end wall 46 welded with weld 47a (47a denoting all welds in FIGS. 6 and 7) to the tube 45 and spaced from the inner ends of the cup-shaped guard member 51 and purifier core unit 41. The opposite or inner end of the tube 45 is closed by a header unit 46a including a flange member 47 secured to the open end of the tube 45, as by a weldment 47a. Header unit 46a is bolted with bolts 53 in a sealed connection using copper seal ring 52a to the flange member 47. The guard member 51 and the purifier core unit 41 are secured to the header 46a to form a removable unit relative to the flange 47 and the outer shell 45 or container 42. Cover 64 is also attached to the flange 46a via bolts 53.

The cup-shaped guard member 51 is formed of suitable perforated metal or other suitable material to confine the catalyst 50 and to permit free passage of the hydrogen as well as other gaseous material. The open end of the guard member 51 is secured to the header 46a by welding or other connecting means.

The purifier core unit 41 is formed of a porous ceramic body 41a with an outer hydrogen permeable metal coating 41b, with presently known materials such as palladium or a palladium copper alloy coating, forming a hydrogen selective membrane, and thus a hydrogen purifier core unit 41. The reformed gases pass freely through the guard 51 into the core unit 41. The hydrogen gas only passes into the inner collection chamber 41c of the core unit 41 as a result of traversing the outer hydrogen selective membrane 41b. The guard 51 may take the form of a porous wall, an apertured wall or even a tubular member directing the free hydrogen toward the end thereof, with the hydrogen discharging therefrom, into the membrane unit. Where the catalyst is in the form of one or more monolithic catalyst elements or units mounted in spaced relation to the selective membrane unit or units, the guard 51 may not be necessary.

Figure 7:
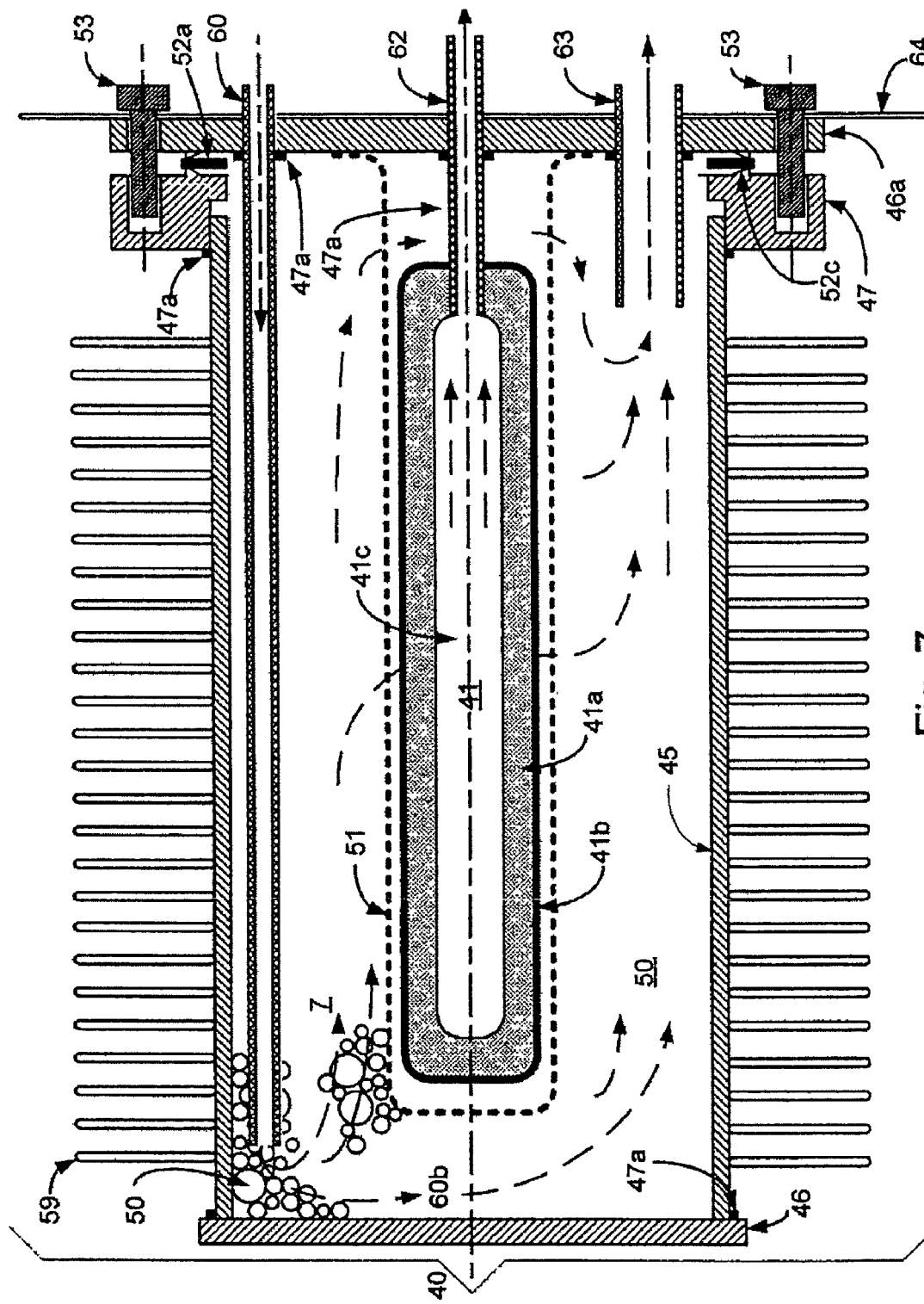
FIG. 7 is a cross section of the vessel unit shown in FIGS. 5 and 6.
Figure 7A:
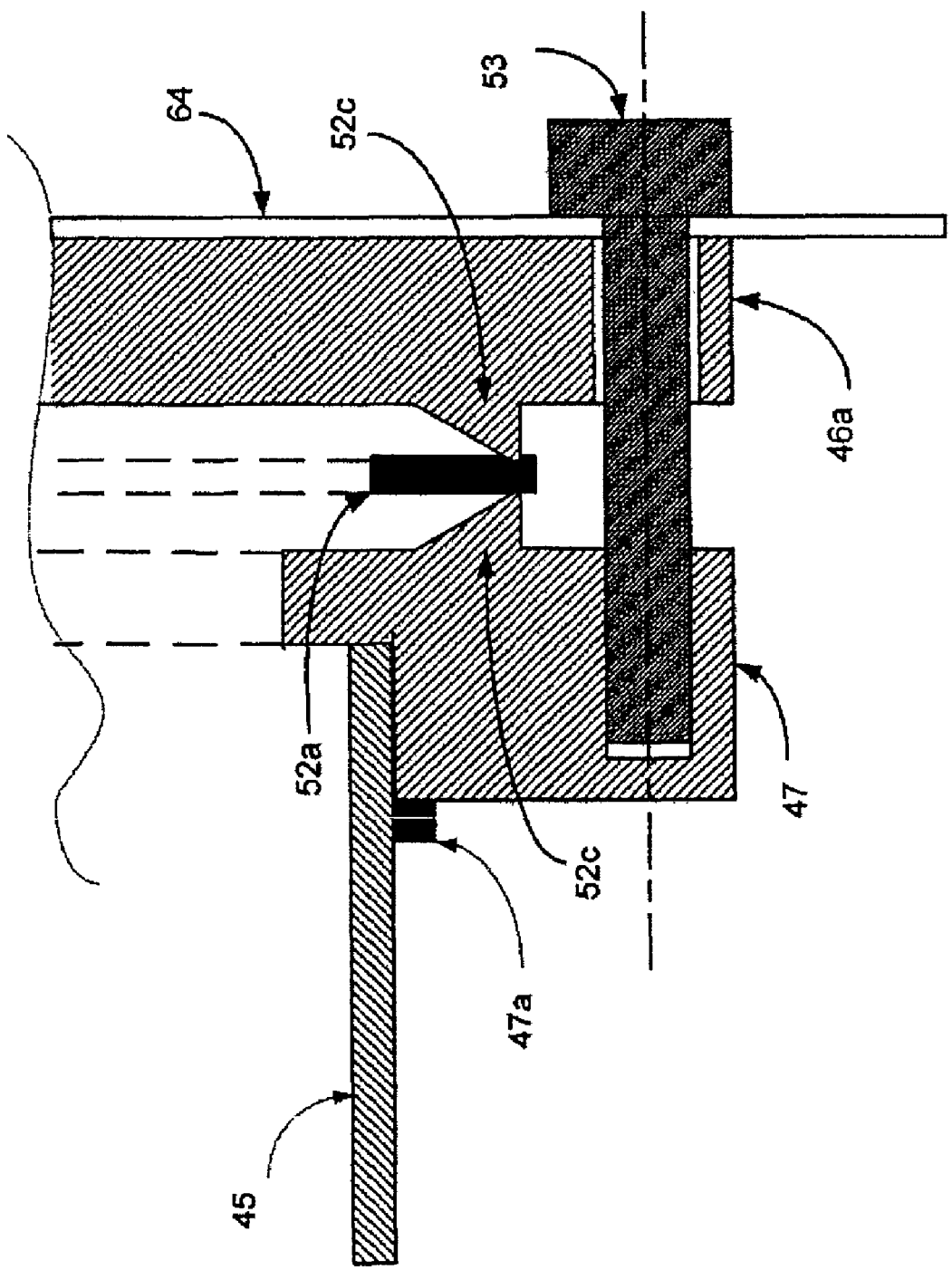
FIG. 7a is an enlarged fragmentary sectional view of parts shown in FIGS. 6 and 7 to illustrate a detail of a sealing unit.

Referring to FIG. 7a, the flange 47 is recessed and telescoped over the outer end of the tube 45 and is welded to the exterior of the tube 45 as at 47a. The header 46a is bolted to the flange 47 with a high pressure sealed gasket 52a therebetween. The illustrated sealed joint (FIG. 7a) includes a copper seal ring 52a located between the flange 47 and header 46a. A sharp sealing edge 52c projects outwardly from 47 and 46a into embedded engagement with the copper ring 52a upon tightening of the securement bolts 53. The seal establishes a high pressure closure to confine reformed gases within vessel 40. Other suitable seals may be used in the preferred system, and in other systems may be constructed without a removable cover structure. For example, end piece 46a may be welded or brazed to the end of tube 45 for a permanent closure of pressure vessel 40.

The input/output lines are sealed within header 46a and are coupled to the several passages within the core unit 41 and catalyst chamber 7 of the illustrated embodiment, as follows.

A feedstock fuel line 60 is secured in sealed relation to the header 46a. The fuel line 60 extends inwardly into the catalyst-filled chamber 7, and through the catalyst 50 to the inner end portion of the chamber. The inner end of line 60 terminates, close to the end wall 46 to feed the hydrogen rich feedstock fuel into the closed end of the catalyst filled chamber 7, under appropriate pressure, to move the feedstock axially through the catalyst 50 toward the header 46a.

An alternate arrangement within the scope of this invention (not shown) utilizes a feedstock delivery tube 60 and a raffinate exit tube 63 which extends the length of catalyst bed 7, where the tubes are closed at the ends and perforated, such that the gas flows between the perforated tubes rather than down the axial length of the catalyst bed. Other arrangements within the pressure vessel apparent to those skilled within the art can be implemented as well.

A hydrogen recovery line 62 is secured within the header 46a and terminates at the inner core chamber 41c of core unit 41 and serves to recover the free hydrogen which has passed through the membrane 41b of purifier core unit 41.

A raffinate line 63 is secured to the header 46a in alignment with the lower or bottom side of the catalyst chamber 7. The pressurized feedstock passes through the catalyst 50 and exits as raffinate through the raffinate line 63 under pressure. The raffinate generally contains a significant level of hydrogen and functions as a fuel for the catalytic burner in the air passageway, as hereinafter described.

The raffinate at the outlet of the catalyst, downstream of the purifier unit 41, can provide a fuel to a catalytic or other burner unit. Unreformed fuel, unrecovered hydrogen, and side-reaction products such as carbon monoxide or methane can serve to function as a fuel in a catalytic or other burners. The particulars of gases contained in the raffinate depend upon the fuel type, steam-to-carbon ratio, pressure, catalyst type, flow rate, and temperature, and may also vary depending on the time on stream of the catalyst. The reformed feedstock with hydrogen removed by purifier 41 is generically identified herein as raffinate, which will cover all reformed feedstock exiting a catalyst unit and a hydrogen purification unit and coupled to the system burner, as disclosed herein, as well as such fuel when combined with or replaced by a separate fuel source.

The container 42 and particularly the tubular wall 45 has spaced and heat conductive fins 59 intimately secured, as by brazing or other high heat transmitting connection, to the container wall 45. The fins 59 are shown as rectangular members which are shaped and formed to fit within the corresponding opening in the enclosure for optimal heating of the catalyst and generation of purified hydrogen, as hereinafter described. The fins 59 are spaced, with size and positioning selected to provide rapid heating of the vessel, while yielding a minimal pressure drop for the laterally passing flue gas flow. The fins 59 are preferably formed of a suitable material such as copper for rapid heat transfer to the vessel, and particularly to catalyst 50.

The pressure vessel 40 (FIG. 4) is removably secured within an opening 65 in the enclosure 36 by a plate 64 secured to the header 46a and to the enclosure frame structure by attachment screws 65a. The finned vessel 40 is enclosed within an internal wall structure to define an air/fuel inlet passageway and an outer exhaust passageway, as hereinafter described.

The finned pressure vessel 40 and particularly purifier core unit 41 thereof may require replacement in the event that a breach or other degradation of membrane 41b occurs, or if the catalyst activity declines significantly due to coking, poisoning, aging, or other reasons. The other components are expected to have a long life.

As shown, the finned pressure vessel 40 is removable as a unit. The illustrated header 46a may be released from flange 47 and replaced by a new header with a new core unit and guard unit within the finned container 42. The catalyst may also be replaced during this operation, which is particularly straightforward if the catalyst is formed as a monolithic annular piece rather than the granular material illustrated as 50. The illustrated unit thus provides for a low cost replacement purifier 41 and pressure vessel 40 for simple serviceability and long life operation of the reformer.

Figure 8:
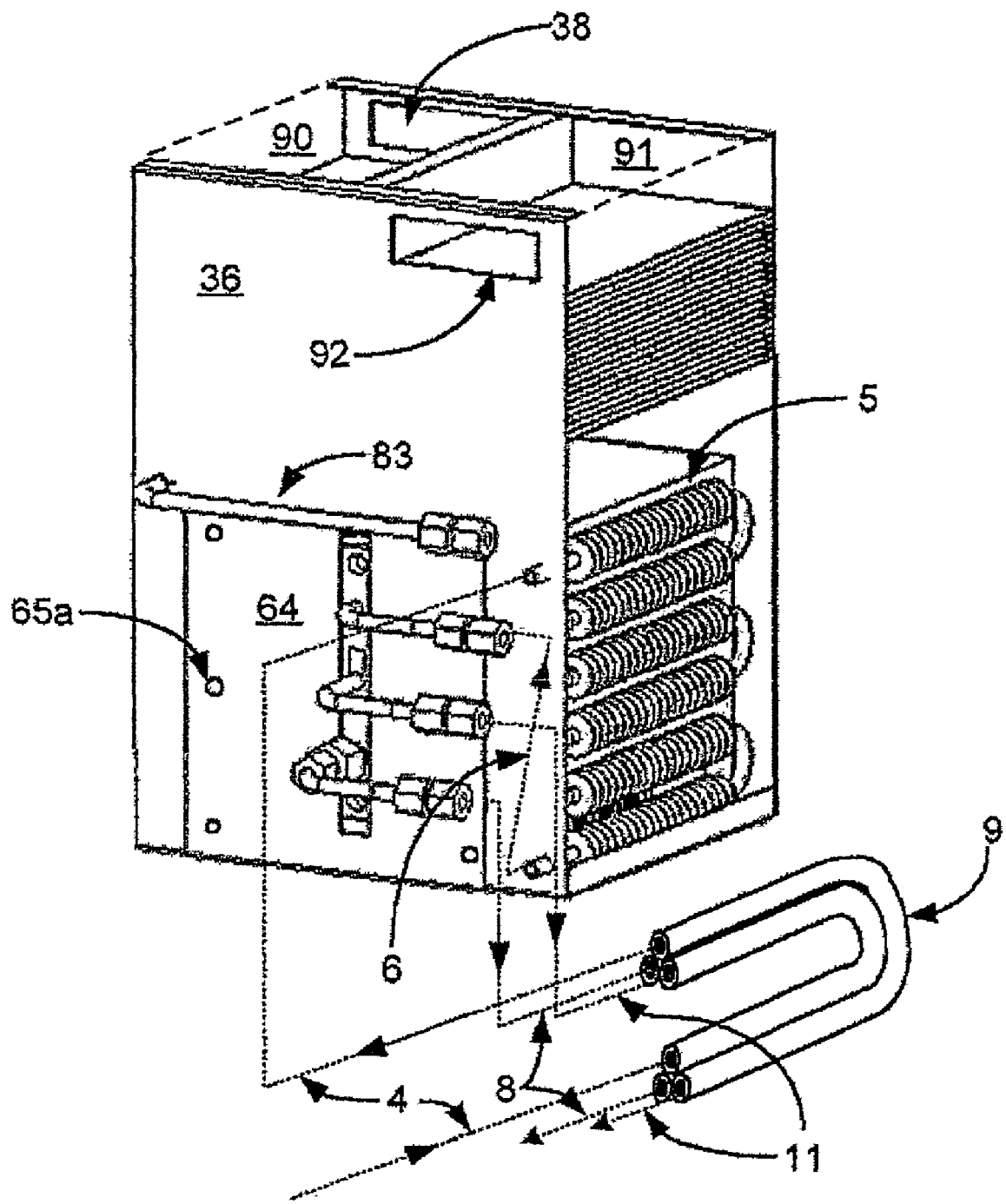
FIG. 8 is a right front perspective view of the hydrogen reformer unit shown in FIG. 4 with the outer enclosure partially removed.
Figure 9:
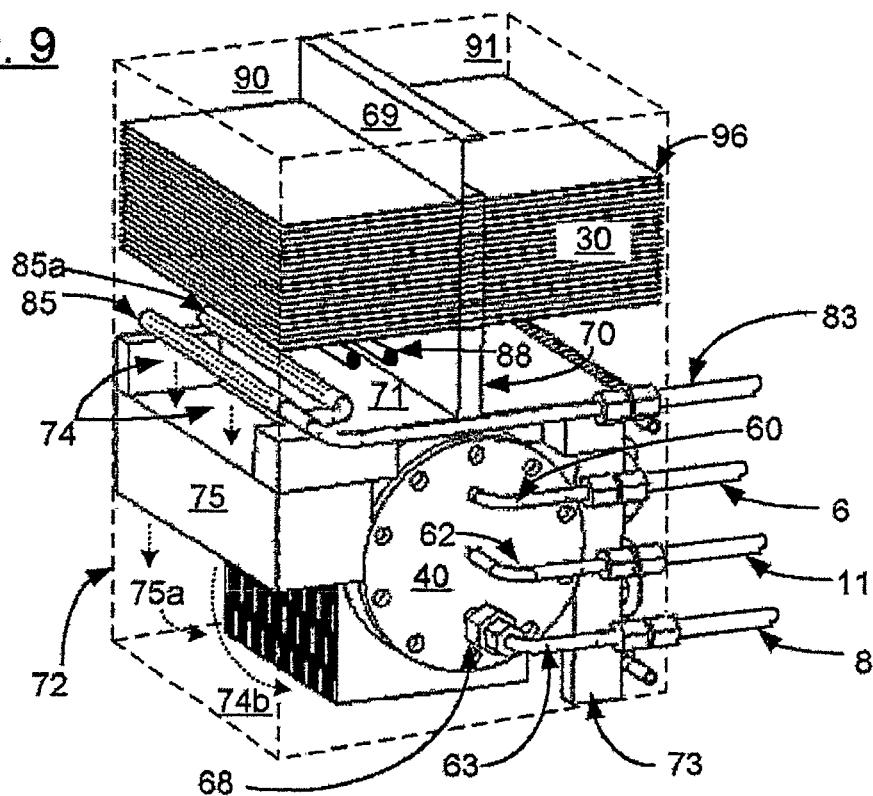
FIG. 9 is a left front perspective view of the reformer unit shown in FIGS. 4 and 8, with the outer enclosure partially removed.

The feedstock feed line 60, the hydrogen ($H_2$) recovery line 62 and the raffinate line 63 are secured to header 46a in spaced relation for inputting the feedstock and withdrawing the purified hydrogen and the raffinate, relative to container 42, as shown in FIGS. 8 and 9. Each line is similarly constructed with a like line coupling unit 67 which may be released and later re-sealed when servicing the unit.

The raffinate line 62 additionally may have a larger releasable coupling 68 between header 46a and the coupling 67 to open the line 63. This provides convenient means for replacing the granular catalyst 50, as may be periodically required. As previously mentioned, when the catalyst consists of one or more monolithic members, header 46a must be removed to replace the monolithic catalyst, in which case coupling 68 becomes unnecessary.

Figure 9A:
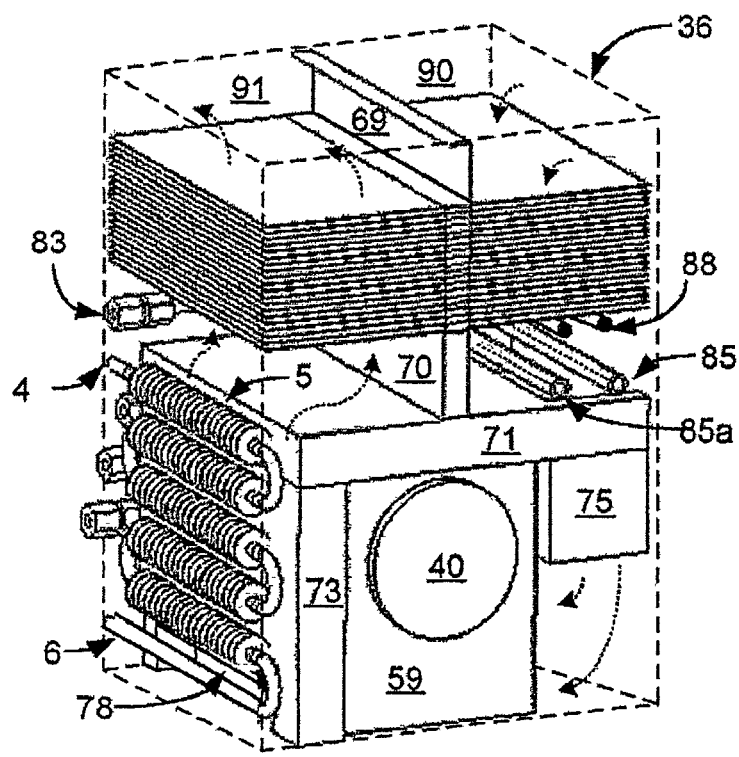
FIG. 9a is a left rear perspective view of the reformer unit shown in FIG. 9.
Figure 9B:
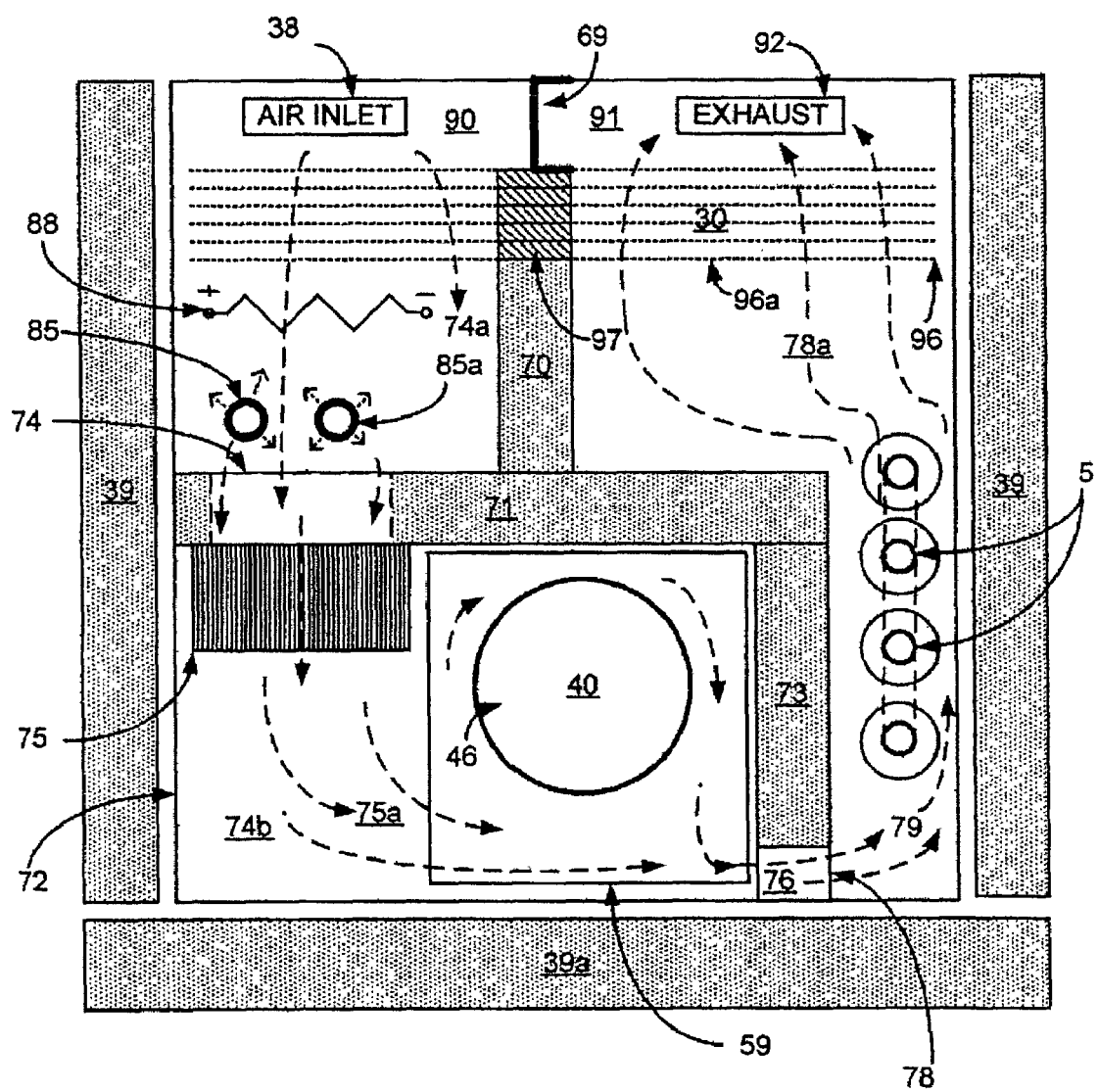
FIG. 9b is a cross-sectional view illustrating a parallel heat processing input passageway and an exhaust output passageway with the inter-related system components.

The pressure vessel 40 is removably mounted within the enclosure 36, as shown in FIGS. 4, 8 and 9-9b by fastening screws 65a. The housing enclosure 36 further contains a variety of interior walls and flow directing means to channel the heating gases through the enclosure. As best shown in FIG. 9b, an upper vertical divider wall 69 divides the air inlet plenum 90 from the exhaust gas plenum 91, extending between and abutting recuperator assembly 30 and the top of enclosure 36, as well as the sides of enclosure 36 to form an effective barrier between plenums 90 and 91. Below the recuperating assembly 30, rigid thermally insulating vertical divider wall 70 further separates the gas flow. Vertical wall 70 abuts and seals to rigid thermally insulating horizontal wall 71. Horizontal wall 71 contains an opening 74 permitting the mixed air and raffinate to flow into catalytic burner 75; otherwise horizontal wall 71 abuts and seals against the outer enclosure 36 and vertical wall 70 to prevent the flow of gases elsewhere. Horizontal wall 71, in combination with the bottom and sides of enclosure 36 and the spaced fins 59 of vessel 40, forms a passageway 74b for flue gas 75a for heating fins 59 and the interior of vessel 40. Downstream of vessel 40, vertical flue gas divider wall 73 formed of rigid thermally insulating material, abutting and sealing against wall 71 and sides of enclosure 36, directs the flue gas through passageway 76 in its opening 78. Wall 73 and the enclosure 36 further define a vertical passage way for flue gas 79, containing heat exchanger 5.

Heat exchanger 5, illustrated as several coils of finned tubing (FIGS. 9a and 9b) is connected within the feedstock line 60 which is connected to the incoming feedstock line 4 to the catalyst bed, as hereinafter described. The finned tubing 5 is located in that portion of exhausting flue gas 79 passing therethrough and is effective for preheating the feedstock in heat exchanger 5 prior to its sequential introduction into line 6, connector 67, and line 60 arriving at the catalyst 50.

Figure 13:
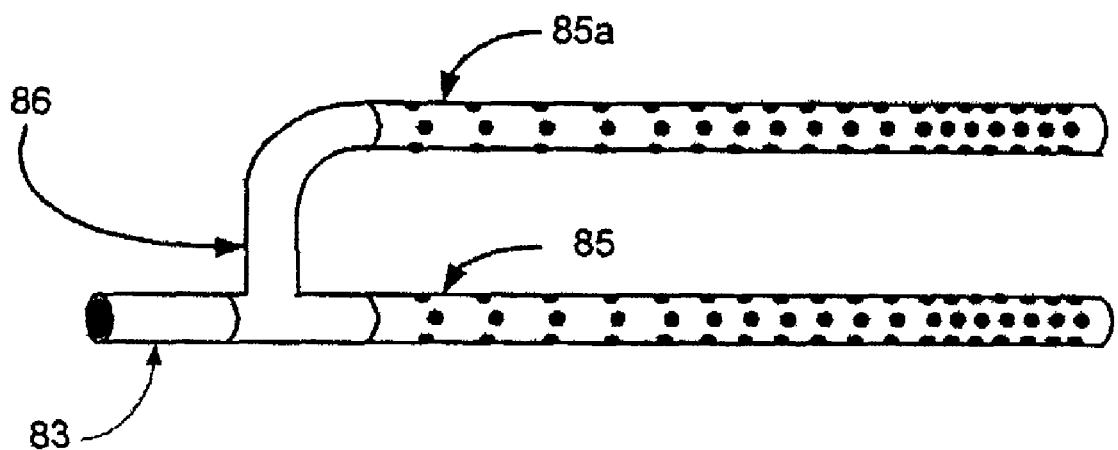
FIG. 13 is a view of a structure for supplying raffinate to the burner to provide a dispersed flue gas to the finned pressure vessel.

Referring to FIGS. 1, 4, 8 and 9, the raffinate supply connection from the reformer vessel 40 to the burner 75 is illustrated, with the lines coupling for preheating the feedstock. Raffinate line 63 exits vessel 40 through coupling 68 and 67 to raffinate line 8 (FIG. 1). Raffinate line 8 passes through heat exchanger 9, and then into control section 37 containing feedstock/raffinate back pressure regulator 10. The back pressure regulator 10 depressurizes the raffinate where it then is allowed to combine with fuel cell bleed hydrogen before arriving at burner feed line 83. Burner feed line 83 then passes into enclosure 36 to the burner distributor. An illustrative burner distributor is shown in FIG. 13 showing a tee fitting 86 and two perforated distributors 85 and 85*a*. 85 and 85*a* are shown in FIGS. 9, 9*a*, and 9*b* as well, where they are positioned to mix the raffinate with the incoming burner air prior to arrival at burner 75.

Each tube 85-85*a* is hollow and sealed at the outer most ends. Each tube 85-85*a* is preferably a porous or perforated material, such as a ceramic material, a sintered metal, or perforated tubing or other like functioning material. At the start of the system operation, the inlet air 74*a* in passageway 74 is relatively cold air and the raffinate cannot be generated until the catalytic bed is at a temperature sufficient to process feedstock. To initiate the bed activation, and to preheat the burner 75 to a temperature sufficient to allow for catalytic combustion of raffinate, an auxiliary heating source is normally required during start-up. An electrical heater 88 is shown mounted (FIGS. 9-9*a*) above the burner 75. The heater 88 is turned on automatically during the start up of the system to heat the inlet air supply to the temperature necessary for raising the catalytic burner temperature to the "light-off" temperature, and the catalyst bed to a temperature sufficient to reform the fuel. Once this temperature is achieved the pump 3 may start pumping feedstock into the device, resulting in generation of the hydrogen freeing reaction in the catalyst 50 and the subsequent raffinate fuel for firing of the burner 75. For alcohol based feedstock, the necessary catalyst bed temperature is on the order of 250-500° C., depending on the fuel and catalyst choice, and the catalytic burner light-off temperature for hydrogen in the raffinate is above approximately 100° C. After the "light-off" state is established at the burner, the heater 88 for heating of the inlet air supply may be terminated because the raffinate entering the burner 75 is then adequate to maintain the proper heating of the catalyst. The preheating of the feedstock as described in the preferred construction, further maintains the proper reactance in the catalyst without an auxiliary heat source after light-off.

The raffinate (FIGS. 9 and 9*b*) is mixed with the air flow in the air inlet passageway 74 and the mixture passes into and through the burner 75 which burns to form high temperature fluid or flue gas 75*a*. The flue gas 75*a* flows directly into the inlet passageway 74*b*, to and over pressure vessel 40 as shown in FIGS. 4, 8 and 9*b*. The heated flue gas 75*a* passes through the fins and over the container 42 of pressure vessel 40 as the only exit from the supply or inlet passageway 74*b*. The fins 59 are suitably spaced transfer the heat into the pressure vessel 40 to heat the catalyst 50 and thereby generate the hydrogen for capture within the core unit 41. Although the feedstock is preheated, as previously described, the reforming reactions requires the additional heat input from the burner to compensate for the endothermic reaction to produce hydrogen.

Figure 12:
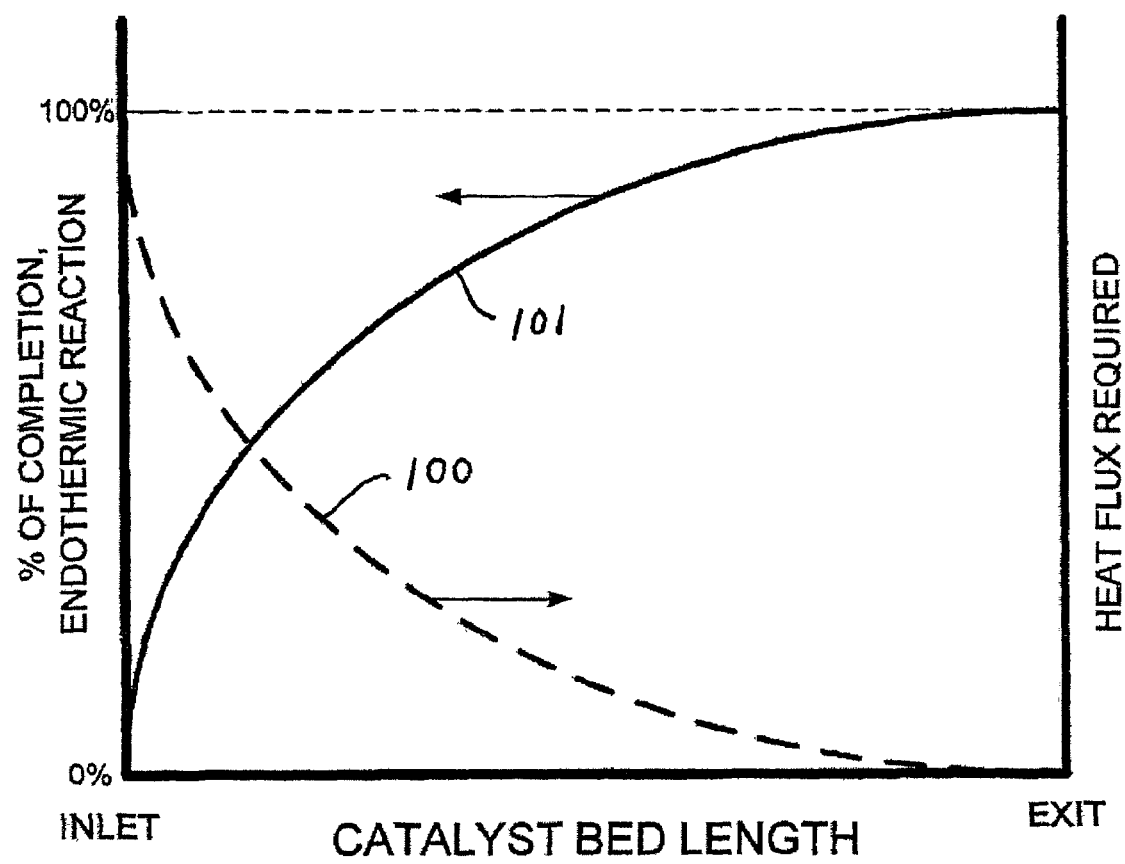
FIG. 12 is a graphical illustration of the heat input to the catalytic bed and the resulting free hydrogen created.

The heating of the catalyst 50 may include special distribution on the axis of the bed or catalyst unit. An optimal heat distribution curve 100 and a resulting reaction curve 101 are shown in FIG. 12. The heat distribution curve 100 is high over approximately the first half of the catalyst 50 and then gradually decreases to a low level adjacent the exit or discharge end of the catalyst, since the bulk of the endothermic reaction occurs at the beginning of the catalyst bed. The resulting reaction curve 101 for generating the free hydrogen includes a rapid increase in the hydrogen over the high heat input portion and then levels off to a slight release curve to the exit or discharge end of the catalyst 50.

Since the heating requirements are higher at the beginning of the catalyst bed, a higher heat flux is desired in this region compared to the exit of the catalyst bed. This can be accomplished by decreasing the spacing of the fins nearer the feedstock inlet, or by increasing the temperature of flue gas 75*a* at the nearer the feedstock inlet, or a combination of both.

FIG. 13 illustrates a special construction of the raffinate input to the burner 75 for the optional heating distribution of the vessel. The raffinate distribution holes in 85 and 85*a* are varied to supply a richer raffinate/air mix nearer the feedstock inlet end of the catalyst bed 7, while the exit ends of 85 and 85*a* have fewer holes, providing a leaner raffinate/air mix. The richest and therefore hottest flue gas is therefore applied at the entrance end of the catalyst bed 7 and the leanest and therefore coolest flue gas at the exit end of the bed 7, generally in accordance with the illustration.

In an alternate configuration the catalytic burner may reside on the surface of the vessel or on the fins secured to the vessel. Methods for forming catalytic surfaces via methods of coating are known to those skilled in the art and are not discussed in further detail. If the catalytic burner is coated on the fins, the fins are preferably closely spaced throughout the length of the catalyst unit. This is necessary to insure that un-burned raffinate does not slip past the fins and flow into the exhaust passageway 76 with the exiting flue gas 79. In this case it is also preferable to use the graduated burner diffuser illustrated in FIG. 13.

Figure 8A:
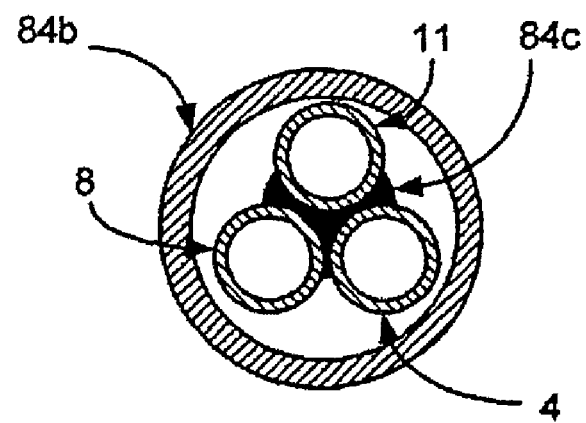
FIG. 8a is a sectional view of a brazed connection of system fluid lines to preheat the feedstock fuel prior to introduction into the pressure vessel.

A preferred feedstock heat exchanger illustrated as finned unit 5 is shown in FIGS. 4, 8 and 8*a*. The lines 8 and 11 exiting vessel 40 via couplings include lengths of bare metal tubes which are assembled with a metal tube of cold feedstock line 4 in positive abutting engagement. The bare metal tubes are held in abutting and heat transfer engagement by a suitable coupling, preferably by a heat transfer bond; for example, brazing or welding the three tubes to each other throughout a substantial length as at 84*c*, or otherwise similar by connecting the tubes with other heat-transmitting and bonding materials. The bonded tubes 4, 8, and 11 may be covered by an outer wrap of an insulating cloth 84*b* over the bonded tubes. The bonded lines are assembled in a counterflow assembly with the coldest end of the feedstock line 4 abutting the coldest ends of lines 8 and 11. This serves to minimize heat losses, increasing the efficiency of the reformer. The heat exchanger 5 also serves to cool the hydrogen and raffinate prior to arriving at regulators 12 and 10, respectively, preventing overheating of the regulators and allowing for a lower cost, lower operating temperature regulator.

The bonded lines 4, 8, and 11 are shown in U-shape configuration with equal side ends to create an extended length. The overall length of the legs is related to and generally corresponds to the length of vessel 40 and the inner core unit so that the heat exchanger unit is sized or scaled to the system size with the vessel 40 and the inlet and exhaust as well as for system scaling as hereinafter discussed.

This also provides a relatively simple but highly effective system for heating of the feedstock. Other systems of coupling the lines to each other may be used. As a result of the recovery of heat and preheating of the feedstock, the required heating of the catalyst bed for effective generation of purified hydrogen is reduced, and the counterflow arrangement of the heat exchanger increases efficiency.

As shown in FIGS. 8-9*b*, the air inlet plenum 90 is formed to one side of wall 69 and extended over one half of the top of enclosure 36. Similarly, the other half of the top of enclosure 36 contains exhaust chamber 91 to the other side of the dividing wall 69. Ambient air from fan 20 arrives in plenum 90 through air inlet 38, and exhaust leaving plenum 91 exits via exhaust aperture 92.

In accordance with the preferred construction and as shown in FIGS. 1 and 8-9b, a heat recovery structure 30 couples in counterflow fashion the heat in the exhaust flue gas 78a to the air arriving through air inlet 38as follows.

The air inlet chamber 90 of FIGS. 1, 8 and 9 is connected to the air supply tube or passageway 38 shown in FIGS. 2a-3. The exhaust chamber 91 includes the exhaust opening 92 in the rear structural wall, as shown in FIGS. 3, 8 and 9b.

A multiple plate assembly 30 is secured below wall 69, spanning the inlet air and exhaust flue gas streams.

Figure 10:
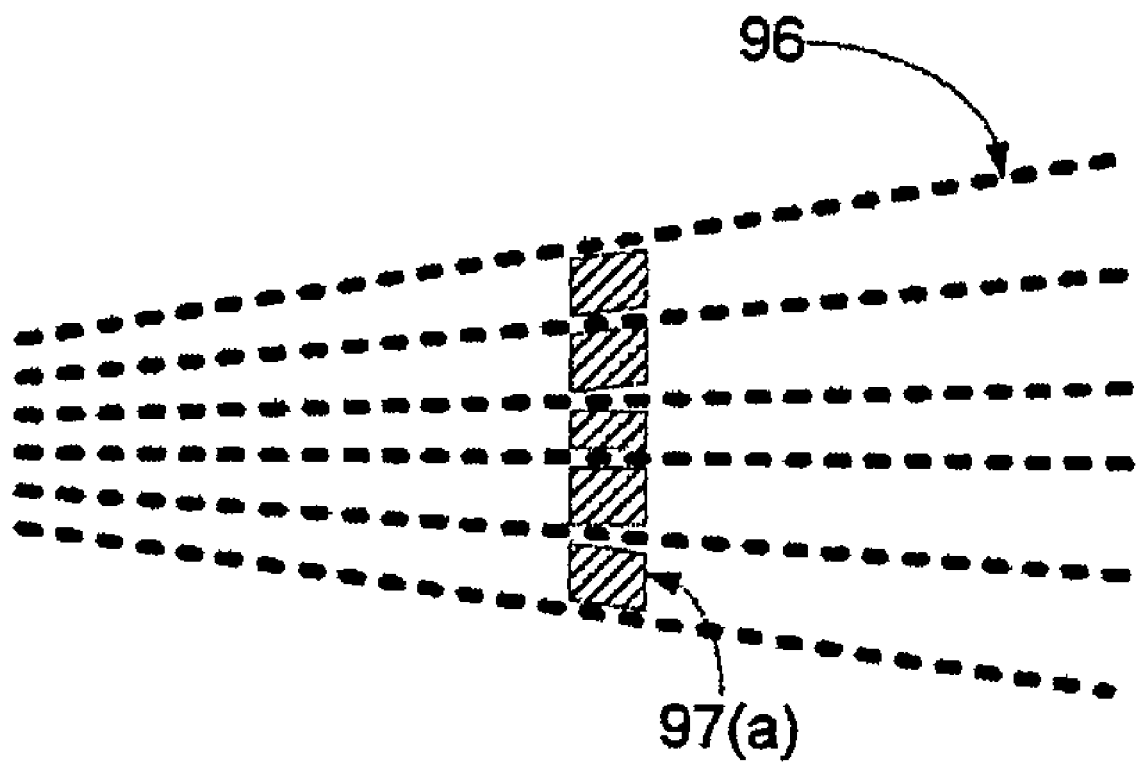
FIG. 10 is an end view of a heat transfer and recuperative unit shown in FIGS. 8 and 9-9b for preheating the air supply to the burner in the instance where the seal between the plates is only formed in one axis.
Figure 11:
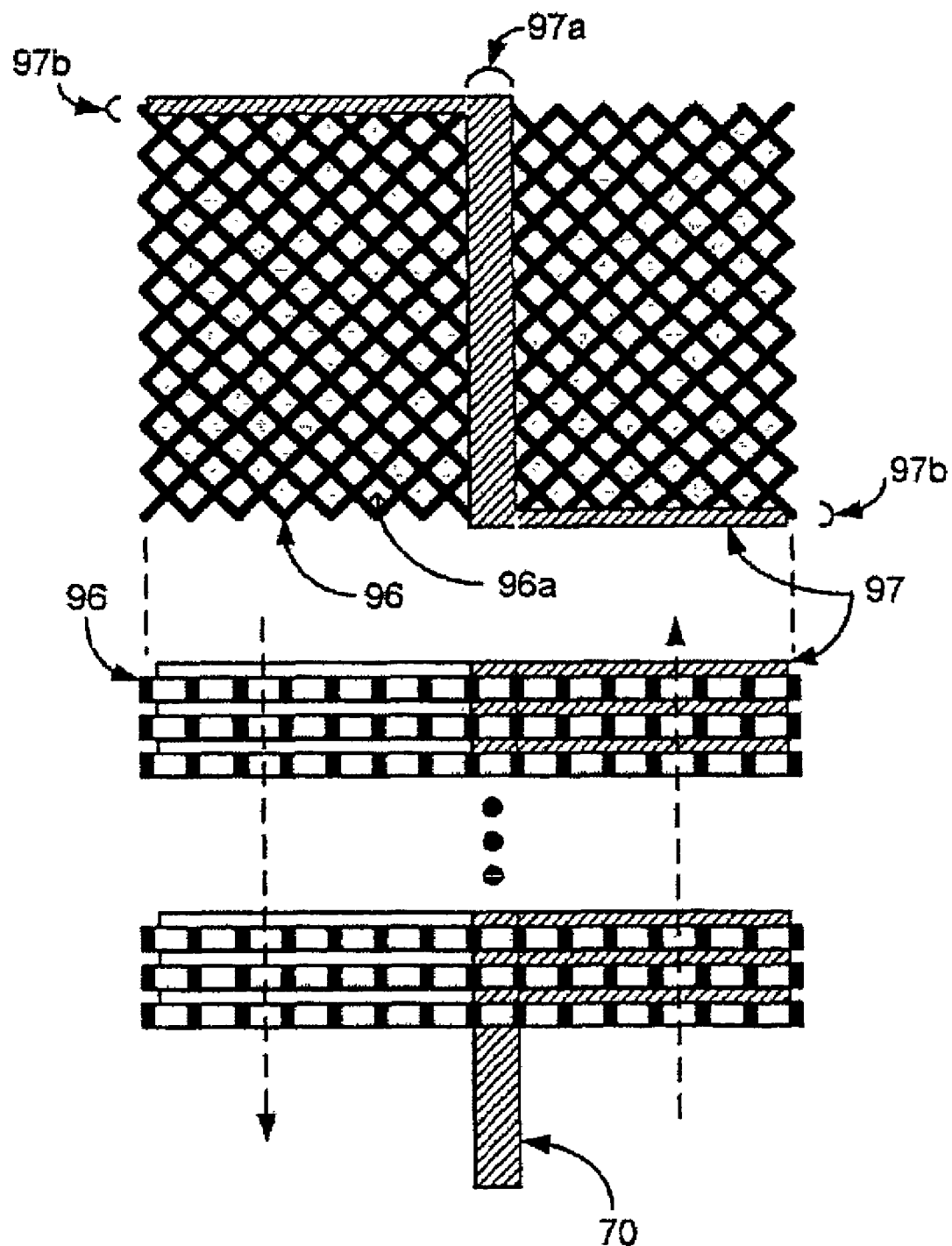
FIG. 11 is an enlarged view of a heat transfer plate of FIG. 10 with an improved plate separating structure.

FIGS. 10 and 11 are enlarged pictorial views of the heat transfer plate assembly 30 with enlarged plates 96 for clearly illustrating one preferred construction of the heat recuperating system for heating the incoming air supply. The multiple plate assembly 30 includes a plurality of heat transfers plates 96 separated by heat insulating and fluid closing wall gasket members 97 which maintain separation of the incoming air with the exiting flue gas, while allowing the plates 96 to pass through and span the incoming air and exiting flue gas regions. The plates 96 may be formed as like plates of a suitable metal such as copper, aluminum or other materials which are a good heat transmitting material. The illustrated diamond shaped openings 96a, or any other shaped openings may be formed in the metal plates. The openings need not have the same shape or size, nor are the openings in the adjacent plates necessarily aligned with each other. The size and frequency of the openings in the plates is scaled sufficient to allow for easy passage of the air and flue gas with a minimal pressure drop in the respective gas streams. The openings also allow for a high surface area for transferring heat into and out of the plates.

The plates 96 and wall members 97 are preferably thin elements. Typically, the plates 96 have a thickness of 0.005-0.100 inches, and more preferably 0.020-0.05 inches. The thickness of the plates is scaled sufficient to yield a low temperature drop while transmitting heat from the flue gas to the incoming air, and depends somewhat on the metals used and the desired heat flux needed through the plates. The separating wall members 97 may have a similar thickness or may be thicker than the plates if desired. The insulating properties of the members 97 are chosen to sufficiently thermally isolate adjacent plates 96; this allows for plates to operate at different temperatures thus permitting counterflow heat exchange between the two gas streams. The lowest plate, in contact with the hottest flue gas 78a, is therefore at the highest temperature, while the highest plate, in contact with the incoming ambient air, is at the lowest temperature.

As illustrated in FIG. 10, the separating wall member 97 does not encourage parallel alignment of plates 96 in recuperating assembly 30. For this reason, member 97(a) is augmented with extending legs 97b as shown in FIG. 11. Stacking of a plurality of members 97 and 96 to form assembly 30 thus forces parallel alignment of plates 96.

Although not illustrated, other embodiments of counterflow heat exchange element 30 are possible. For example, in an annular arrangement sealing member 97 becomes donut-shaped, and extending legs 97b are no longer required to yield a parallel orientation of plates 96, where the plates extend between an inner and outer annulus for heat transfer. In yet another configuration, two separate perforated plates may be folded into a serpentine pattern, yielding parallel plates. These two pieces may be brazed together with a thin piece of metal which serves as divider 97. One serpentine assembly of parallel plates would extend into the air plenum, while the other would extend into the flue gas plenum, and the heat transfer between plenums would occur at the brazed joint over the single metal divider 97. Other additional variations may be obvious to those skilled in the art.

In summary, the illustrated embodiment discloses a preferred construction for preheating the supply input air which is supplied to burner 75. A practical assembly only needs to include plates or other elements which provide effective heat transfer of the heat in the exhaust gas to the inlet air via mounting of the elements in sealed relation within a separating wall; within the broadest aspect of the present invention.

The construction for the recovery of the heat in the exhaust gas should include the relatively large cross-sectional flow areas of the chambers and the associated air and exhaust passageways as well as relatively large openings within the heat transfer plates or other heat transfer elements forming like large openings such that the structure creates a low pressure drop, and a resulting low power consumption to supply air through fan 20.

Like consideration is given to the passageway associated with the heating of the pressure vessel 40. Thus, the catalytic burner 75 preferably has a relatively large cross-section and is formed with a substantial plurality of like parallel passages in the direction of the air/fuel flow therethrough.

For example, a two-inch deep burner having passages on the order of 200 cells per square inch and of an extruded ceramic with a precious metal coating is one example of a higher satisfactory burner, in accordance with known construction. The recuperator for heating the input air may likewise be formed from aluminum in an expanded and rolled pattern with an open area approaching 40%.

The pressure vessel 40 is similarly and preferably constructed with a relatively large finned construction and with proper spacing of the fins to establish a low system pressure drop in the gases passing over the vessel, as is heat exchanger 5.

The other heat recovery systems such as the preheat of the feedstock fuel and the recovery of the heat from the purified hydrogen and the reformed gases within the system also provide significant results in producing an efficient and improved reforming apparatus.

The combined structure with the special air and fuel supplies including the heat exchanges at the air inlet and exhaust passageways, the feedstock preheat coil, the coupled flow lines, the catalytic burner and the finned pressure vessel may yield a significantly low burner gas pressure drop. As a result, the electrical power requirement for moving of the air and flue gases into and through the unit is low. This, in combination with low thermal losses, yields a corresponding increase in reformer efficiency.

The unique characteristic of the illustrated design also allows for cost effective scalable construction of the systems with different maximum output levels. The several components and parts of the illustrated embodiment with the linear axis permits construction of the vessel of different capacity by designing the linear length of the components to be directly related to the desired capacity. Thus, each of the interacting components including the burner area, heat exchange area, the catalyst volume, purifier membrane area, the exhaust heat transfer system, the counter flow heating unit coupling the feedstock line to the raffinate line and/or the hydrogen line are directly related to the length on the linear axis of the elements and components and therefore the final structure, as disclosed herein.

For example, if the length of the pressure vessel is doubled, the lengths of the air and exhaust chambers, the inlet air supply and feedstock heat transfer units, and the burner and related passageway will double, producing a doubled output capacity.

The design and structure of the device is particularly unique in allowing for the ease in scalability, but also provides a cost effective service construction. In the purifier, the membrane and catalyst component may require periodic replacement and is readily replaced in the preferred embodiment. Service in the field may thus consist of simply and easily replacing the entire finned pressure vessel containing the purifier unit and catalyst, or replacing the guard and core unit as attached to the header while reusing the finned vessel and flange unit.

The illustrated embodiment may process any of a variety of feedstocks. Although illustrated in the preferred embodiment using a miscible water/fuel feedstock, separate fuel and water supply means may be employed, for a variety of fuels, and which may include various other steps such as fuel desulphurization, water conditioning, and the like, in accordance with typical feed conditioning steps as disclosed in the known art. Likewise, the size and placement of the various components may be varied in keeping with the present disclosure. For example, improvements in membrane technology will allow for a much smaller membrane collector area, and similar improvements in catalyst may allow for a smaller catalyst volume.

The specific monitoring, operation, and control of the reformer, with the typical user interface requirements such as LCD display 22 and operator controls 23 (see FIG. 2), involve devices, hardware, operating states, and algorithms previously disclosed and known to those skilled in this art. A typical example can be found in "PC-25 C On-Site Fuel Cell Power Plant Service Manual Volume 1", ONSI Corporation (April 1996), and the like.

In summary, the present invention provides an improved and unique reformer structure for generating of purified hydrogen from the various fuels containing hydrogen. The illustrated preferred embodiment of the invention also provides a reforming system which is operable with a low pressure drop in the air supply system, with a resulting cost effective system.

I claim:

1. A reformer for separating and purifying hydrogen from a hydrogen rich feedstock comprising:

a linear metallic pressure vessel having a catalyst bed disposed along a linear axis within the pressure vessel for producing hydrogen, said vessel constructed and arranged with a feedstock inlet for introducing pressurized fuel to be reformed to said catalyst bed and a reformed gas outlet, a hydrogen selective membrane positioned downstream of the catalyst bed and operable to receive reformed gas and separate the reformed gas into hydrogen and raffinate, and a heating unit located upstream of said pressure vessel and directly discharging a heated fluid stream through the catalyst bed laterally to the linear axis of the catalyst bed, said heated fluid stream having a length substantially corresponding to the length of the catalyst bed; and wherein said pressure vessel is mounted within a housing, the housing including a vertical wall dividing said housing into an air inlet passageway including an air inlet chamber on one side of said vertical wall to supply air to heating and unit located upstream of said pressure vessel and defining an exhaust passageway including an exhaust chamber on the opposite side of said wall to discharge exhaust gas from said heating unit; and wherein said heating unit comprises a catalytic burner with said inlet air passing through said catalytic burner, said raffinate connected to a fuel dispersing unit located upstream of the burner in the inlet air passageway, said dispersing unit mixes said inlet air with said raffinate and directs said air/raffinate fuel mixture to said catalytic burner for generating said heated fluid stream passing laterally over the pressure vessel to heat the catalyst bed to a desired reaction temperature for production of hydrogen; and a counterflow exhaust heat recuperating system for heating of the inlet air supply, said recuperating system comprising a plurality of heat transmitting plates formed of thermally conductive material, and each of said plates transversely mounted on said vertical wall and extending across said inlet and exhaust passageways and including a plurality of distributed opening to permit essentially free air flow and exhaust gas flow through said plates, and sealing means between said plates and said vertical wall to prevent mixing exhaust and inlet gas streams, whereby said plate facilitate the flow of heat from the exhaust flue gas stream to the inlet air supply.

2. The reformer of claim 1 where said sealing means comprises a thermally insulating sealing member placed between each of said plates, and where the sealing member is of sufficient width to substantially prevent mixing of the inlet air and exhaust flue gas.

3. The reformer of claim 2 wherein each of said plates is located in a plane perpendicular to the flow of said inlet air supply and said exhaust flue gas.

4. A reformer for separating and purifying hydrogen from a hydrogen rich feedstock comprising:

a linear metallic pressure vessel having a catalyst bed disposed along a linear axis within the pressure vessel for producing hydrogen, said vessel constructed and arranged with a feedstock inlet for introducing pressurized fuel to be reformed to said catalyst bed and a reformed gas outlet, a hydrogen selective membrane positioned downstream of the catalyst bed and operable to receive reformed gas and separate the reformed gas into hydrogen and raffinate, and a heating unit located upstream of said pressure vessel and directly discharging a heated fluid stream past the catalyst bed in a path substantially perpendicular to the axis of the linear metallic pressure vessel, said heated fluid stream having a length substantially corresponding to the length of the catalyst bed.

5. The reformer of claim 4 where the catalyst-containing linear metallic pressure vessel is a cylinder which also contains said hydrogen selective membrane, and the catalyst bed surrounds the hydrogen selective membrane in coaxial relationship within the vessel.

6. The reformer of claim 5 where the feedstock inlet and reformed gas outlet are spaced apart with the catalyst bed therebetween such that the heating fluid stream effectively heats the fuel and catalyst bed to facilitate the production of hydrogen.

7. The reformer of claim 6 wherein said catalyst bed and the hydrogen selective membrane are separated by a guard wall preventing engagement of the catalyst bed with the membrane.

8. The reformer of claim 6 further including an end wall connected to one end of the vessel, said feedstock inlet extending through said end wall into the catalyst bed to discharge the feedstock into the catalyst bed, a hydrogen recovery line extending through the end wall connected to said membrane to recover purified hydrogen and said reformed gas outlet extending through said end wall at a location spaced from said feedstock inlet.

9. The reformer of claim 5 wherein said vessel has opposite ends, one end being closed and the other end being open, and said reformer further includes a header unit releasably secured to said other end of said vessel in a sealed fashion wherein the feedstock inlet, reformed gas outlet and purified hydrogen all pass through the header unit.

10. The reformer of claim 9 wherein said catalyst bed and the hydrogen selective membrane are separatedly by a guard wall preventing engagement of the catalyst bed with the membrane.

11. The reformer of claim 10 wherein said guard wall is secured to said header unit and forms an inner annular wall for the catalyst bed.

12. The reformer of claim 5 wherein said vessel includes a closure wall at one end and an opposite open end, and a header unit releasable connected to and closing the open end of said vessel, a releasable securement means connecting said vessel to the header unit, and a fixed connection of said hydrogen selective membrane to said header unit for permitting separation of the membrane from said vessel and said header for replacement of said membrane or the catalyst bed surrounding the membrane.

13. The reformer of claim 12 including a guard wall connected to said header unit and located between said membrane and said catalyst bed.

14. The reformer of claim 13 wherein said header unit includes a mounting flange secured to said vessel and an end wall releasably secured to said flange, said feedstock inlet extending through said end wall into the catalyst bed to discharge the feedstock into the catalyst bed, a hydrogen recovery line extending though said end wall and in communication with the membrane to recover the hydrogen, and the reformed gas outlet extending though said end wall coupled to the catalyst bed to receive the raffinate from the catalyst bed, and wherein said heating unit includes a burner having a depressurized fuel supply containing said raffinate.

15. The reformer of claim 14 wherein said guard wall and said membrane are secured to said releasable end wall for replacement as a unit.

16. The reformer of claim 14 wherein said flange is interconnected in fixed relation to the vessel with a seal located between opposed surfaces of said flange and said end wall to provide a high pressure seal about the open end of said vessel, and said guard wall and said membrane being fixed to said end wall and removable as a unit for replacement of the membrane and guard wall while maintaining the finned outer vessel.

17. The reformer of claim 4 wherein said membrane removes only a portion of the hydrogen from the reformed gas a purified hydrogen and said raffinate includes some retained hydrogen.

18. The reformer of claim 4 where said heating unit comprises a catalytic burner, and means for passing a mixture of said raffinate and air through said burner and generating said heated fluid stream for heating the vessel.

19. The reformer of claim 18 further including raffinate pressure control means for depressurizing the raffinate, a dispersing member located downstream of said depressurized raffinate for dispersing said depressurized raffinate in air, and means for feeding the raffinate/air mixture to said catalytic burner to supply said heated fluid stream.

20. The reformer of claim 19 wherein the said dispersing member comprises one or more porous members arranged such that the distributed raffinate/air mixture is richer at the feedstock inlet, and the raffinate/air mixture is leaner at the reformed gas outlet resulting in a higher heat flux per unit area in the catalyst bed, near the feedstock inlet than compared to in the catalyst bed near the reformed gas outlet.

21. The reformer of claim 4 further including a hydrogen exit line communicating with the hydrogen selective membrane, and wherein said pressurized feedstock inlet is coupled in counterflow fashion to at least one of said hydrogen exit line and said reformed gas outlet to preheat said feedstock.

22. The reformer of claim 21 wherein said feedstock inlet is coupled to both said hydrogen exit line and said reformed gas outlet.

23. The reformer of claim 4 wherein said hydrogen selective membrane is formed of a material selected from the group consisting of an inorganic molecular sieve, a pure metal, an alloyed metal, and an inorganic molecular sieve in combination with a pure or alloyed metal.

24. The reformer of claim 4 wherein said hydrogen selective membrane is secured to a porous core and wherein said porous core is formed of a material selected from the group consisting of a porous metallic material, a porous ceramic material, a porous carbon-containing material, or a laminate of said materials.

25. The reformer of claim 24 wherein said membrane secured to said core has a thickness in the range of 0.1 to 100 microns.

26. The reformer of claim 4 wherein a methanation catalyst is located on one side of the purifier membrane.

27. The reformer of claim 4 including a series of spaced fins secured to the vessel and projecting outwardly from the vessel, said fins being heat conductive to transmit heat to the vessel for heating of said catalyst bed.

28. The reformer of claim 27 wherein said fins are rectangular fins and define a rectangular outer surface configuration.

29. The reformer of claim 28, including an enclosing means defining a heating passageway over said vessel including a flue gas inlet passageway and a flue gas exhaust passageway to opposite sides of the vessel between said enclosing means.

30. The reformer of claim 27 wherein said fins are uniformly spaced over the length of said vessel to control the heating of said catalyst bed.

31. The reformer of claim 27 wherein said fins are variably spaced over the length of said vessel to produce an asymmetric heat flux in the catalyst bed.

32. The reformer of claim 27 wherein said heating unit comprises a catalytic burner and said catalytic burner is formed as a coating on the surface of the fins.

33. The reformer of claim 4 further including a ceramic member having said hydrogen selective membrane secured to its outer surface.

34. The reformer of claim 33 wherein said membrane is a metal member plated on said ceramic member.

35. The reformer of claim 4 wherein said feedstock inlet includes a conduit arranged in a serpentine path located in the path of said heated fluid stream downstream of said pressure vessel.

36. The reformer of claim 4 wherein said pressure vessel is mounted within a housing, the housing including a vertical wall dividing said housing into an air inlet passageway including an air inlet chamber on one side of said vertical wall to supply air to heating and unit located upstream of said pressure vessel and defining an exhaust passageway including an exhaust chamber on the opposite side of said wall to discharge exhaust gas from said heating unit.

37. The reformer of claim 36 wherein said inlet and exhaust passageways are constructed and scaled to establish a low pressure flow path of less than 1 psi through the air inlet passageway and the exhaust passageway.

38. The reformer of claim 36 wherein said heating unit comprises a catalytic burner with said inlet air passing through said catalytic burner, said raffinate connected to a fuel dispersing unit located upstream of the burner in the inlet air passageway, said dispersing unit mixes said inlet air with said raffinate and directs said air/raffinate fuel mixture to said catalytic burner for generating said heated fluid stream passing laterally over the pressure vessel to heat the catalyst bed to a desired reaction temperature for production of hydrogen.

39. The reformer of claim 4 wherein said pressure vessel includes an outer wall and opposite ends, one end being closed and the other end being open, and said vessel further includes a flange secured to the open end of said outer wall, an outer header bolted to said flange and operable to close the open end of said pressure vessel, said flange and said header having opposed flat surfaces each having a sealing recess in alignment with each other, each of said recesses including an outwardly extended finger aligned with each other, and a seal member located within the aligned recesses and having said fingers forced into sealing engagement therewith upon attachment of the header to the flange.

40. The reformer of claim 39 wherein said seal member is a ductile metal-member.

* * * * *